(12) United States Patent
Meredith et al.

(10) Patent No.: US 7,467,371 B1
(45) Date of Patent: Dec. 16, 2008

(54) BINDING FOR BUSINESS WORKFLOW PROCESSES

(75) Inventors: Lucius Gregory Meredith, Seattle, WA (US); Marc Levy, Woodinville, WA (US); Brian Beckman, Newcastle, WA (US); Anthony Andrews, Redmond, WA (US); Bimal Mehta, Redmond, WA (US); Mitra Kanchan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/560,371

(22) Filed: Apr. 28, 2000

(51) Int. Cl.
*G06F 9/44* (2006.01)

(52) U.S. Cl. .................. 717/104; 717/100; 717/102; 717/103

(58) Field of Classification Search ............ 703/21; 717/100, 104, 101–102; 705/1, 8; 707/10; 719/316
See application file for complete search history.

(56) References Cited

U.S. PATENT DOCUMENTS

| | | | |
|---|---|---|---|
| 5,261,069 A | 11/1993 | Wilkinson et al. ........... 711/185 |
| 5,301,320 A * | 4/1994 | McAtee et al. .................. 705/9 |
| 5,524,241 A | 6/1996 | Ghoneimy et al. ............ 707/10 |
| 5,581,691 A | 12/1996 | Hsu et al. ....................... 714/15 |
| 5,630,069 A * | 5/1997 | Flores et al. .................... 705/7 |
| 5,706,429 A | 1/1998 | Lai et al. ..................... 709/230 |
| 5,745,901 A * | 4/1998 | Entner et al. ............. 707/103 R |
| 5,768,506 A * | 6/1998 | Randell ....................... 709/202 |
| 5,774,661 A * | 6/1998 | Chatterjee et al. ........... 709/203 |
| 5,838,973 A * | 11/1998 | Carpenter-Smith et al. .. 717/105 |
| 5,848,393 A * | 12/1998 | Goodridge et al. ............. 705/8 |
| 5,867,824 A * | 2/1999 | Saito et al. ...................... 705/9 |
| 5,878,398 A * | 3/1999 | Tokuda et al. .................. 705/8 |
| 5,890,130 A * | 3/1999 | Cox et al. ........................ 705/7 |
| 5,918,218 A | 6/1999 | Harris et al. ................... 705/37 |
| 5,930,512 A * | 7/1999 | Boden et al. ................. 717/102 |
| 5,940,804 A * | 8/1999 | Turley et al. .................... 705/9 |
| 5,940,839 A | 8/1999 | Chen et al. .................. 707/202 |
| 5,960,404 A * | 9/1999 | Chaar et al. .................... 705/8 |
| 5,960,420 A | 9/1999 | Leymann et al. ............... 707/1 |
| 5,974,392 A * | 10/1999 | Endo ............................. 705/8 |

(Continued)

OTHER PUBLICATIONS

Workflow Management Coalition, A Common Object Model Discussion Paper, Jan. 1998, WfMC-TC-1022, pp. 1-16.*

(Continued)

*Primary Examiner*—William H Wood
(74) *Attorney, Agent, or Firm*—Amin, Turocy & Calvin, LLP

(57) ABSTRACT

A methodology of employing a binding for interfacing a business workflow process executable program to a real world implementation. The binding can be reduced to a programming language. A preferable programming language is XML (Extensible Markup Language). Separation of the business workflow processes and the binding allow for the same business workflow process to be implemented across a variety of different technologies. The binding maps ports and messages to corresponding units of codes and invocations of a particular technology being utilized for the modeling of the business workflow process. The binding provides a user with the ability to structure schedule messages, define the relationship of schedule ports to units of code, define the relationship of schedule actions to invocations, control the flow of data between messages, provide details of schedule conditionals and specify the interaction of the schedule with specific technology behaviors.

17 Claims, 42 Drawing Sheets

U.S. PATENT DOCUMENTS

| | | | | |
|---|---|---|---|---|
| 5,978,836 | A * | 11/1999 | Ouchi | 709/206 |
| 5,987,422 | A * | 11/1999 | Buzsaki | 705/9 |
| 5,999,910 | A * | 12/1999 | Rosenfeld et al. | 705/7 |
| 5,999,911 | A * | 12/1999 | Berg et al. | 705/9 |
| 6,003,011 | A * | 12/1999 | Sarin et al. | 705/9 |
| 6,009,405 | A | 12/1999 | Leymann et al. | 705/9 |
| 6,014,673 | A * | 1/2000 | Davis et al. | 707/202 |
| 6,026,365 | A * | 2/2000 | Hayashi | 705/9 |
| 6,032,124 | A * | 2/2000 | Saito et al. | 705/9 |
| 6,038,538 | A * | 3/2000 | Agrawal et al. | 705/7 |
| 6,038,541 | A * | 3/2000 | Tokuda et al. | 705/8 |
| 6,058,413 | A * | 5/2000 | Flores et al. | 718/101 |
| 6,073,109 | A * | 6/2000 | Flores et al. | 705/8 |
| 6,115,640 | A * | 9/2000 | Tarumi | 700/99 |
| 6,151,583 | A * | 11/2000 | Ohmura et al. | 705/8 |
| 6,233,537 | B1 * | 5/2001 | Gryphon et al. | 703/1 |
| 6,256,651 | B1 * | 7/2001 | Tuli | 715/526 |
| 6,275,846 | B1 * | 8/2001 | Kondo et al. | 709/200 |
| 6,308,314 | B1 * | 10/2001 | Carlson et al. | 717/104 |
| 6,430,538 | B1 * | 8/2002 | Bacon et al. | 705/9 |
| 6,442,563 | B1 * | 8/2002 | Bacon et al. | 707/103 R |
| 6,442,594 | B1 * | 8/2002 | Ouchi | 709/206 |
| 6,507,856 | B1 * | 1/2003 | Chen et al. | 715/513 |
| 6,516,322 | B1 | 2/2003 | Meredith | |
| 6,574,675 | B1 * | 6/2003 | Swenson | 719/316 |
| 6,598,219 | B1 * | 7/2003 | Lau | 717/108 |
| 6,606,740 | B1 * | 8/2003 | Lynn et al. | 717/100 |
| 6,643,652 | B2 * | 11/2003 | Helgeson et al. | 707/10 |
| 6,718,371 | B1 * | 4/2004 | Lowry et al. | 709/203 |
| 6,968,503 | B1 | 11/2005 | Chang et al. | |
| 7,171,647 | B1 * | 1/2007 | Smith et al. | 717/105 |
| 2001/0044738 | A1 * | 11/2001 | Elkin et al. | 705/8 |
| 2002/0019797 | A1 | 2/2002 | Stewart et al. | |
| 2002/0049603 | A1 * | 4/2002 | Mehra et al. | 705/1 |
| 2002/0108101 | A1 * | 8/2002 | Charisius et al. | 717/105 |
| 2004/0078373 | A1 * | 4/2004 | Ghoneimy et al. | 707/10 |

OTHER PUBLICATIONS

Workflow Management Coalition, Workflow and Internet: Catalysts for Radical Change, A WfMC White Paper, Jun. 1998, pp. 1-32.*

Hemang Lavana et al, Executable Workflows: A Paradigm for Collaborative Design on the Internet, Sep. 1996.*

Developing a WFT Workflow System, Template Software, 1998, Whole Manual.*

Using the WFT Development Environment, Template Software, 1998, Whole Manual.*

"Using the Web Component", Web Component Foundation Template, Template Software version 8.0, 1997, Chapters 1-3.*

Using the SNAP Communication Component, Template Software, 1998, Whole Manual.*

Goldfarb et al., The XML Handbook, 1998, pp. 3-18, 101-118.*

Workflow Template Training Course, Version 8.0, 1997, Section A.*

"Workflow Management Coalition Workflow Standard—Interoperability Wf-XML Binding", The Workflow Management Coalition, Jan. 11, 2000.*

David Stirrup, "XML based Process Management Standard launched by Workflow Management Coalition—Wf-XML", Jul. 7, 1999.*

Messa et al., "Visual Software Development Uisng An Object-Relationship Model", ACM, 1999.*

"Workflow Management Coalition Workflow Standard—Interoperability Wf-XML Binding" (Jan. 11, 2000) Workflow Management Coalition, Doc. No. WFMC-TC-1023, 40 pages.

XML based Process Management Standard Launched by Workflow Management Coalition-'Wf-XML', (Jul. 7, 1999) httP://www.wfmc.org/pr/pr1999-07-07.pdf> last accessed Jan. 3, 2006, 4 pages.

* cited by examiner

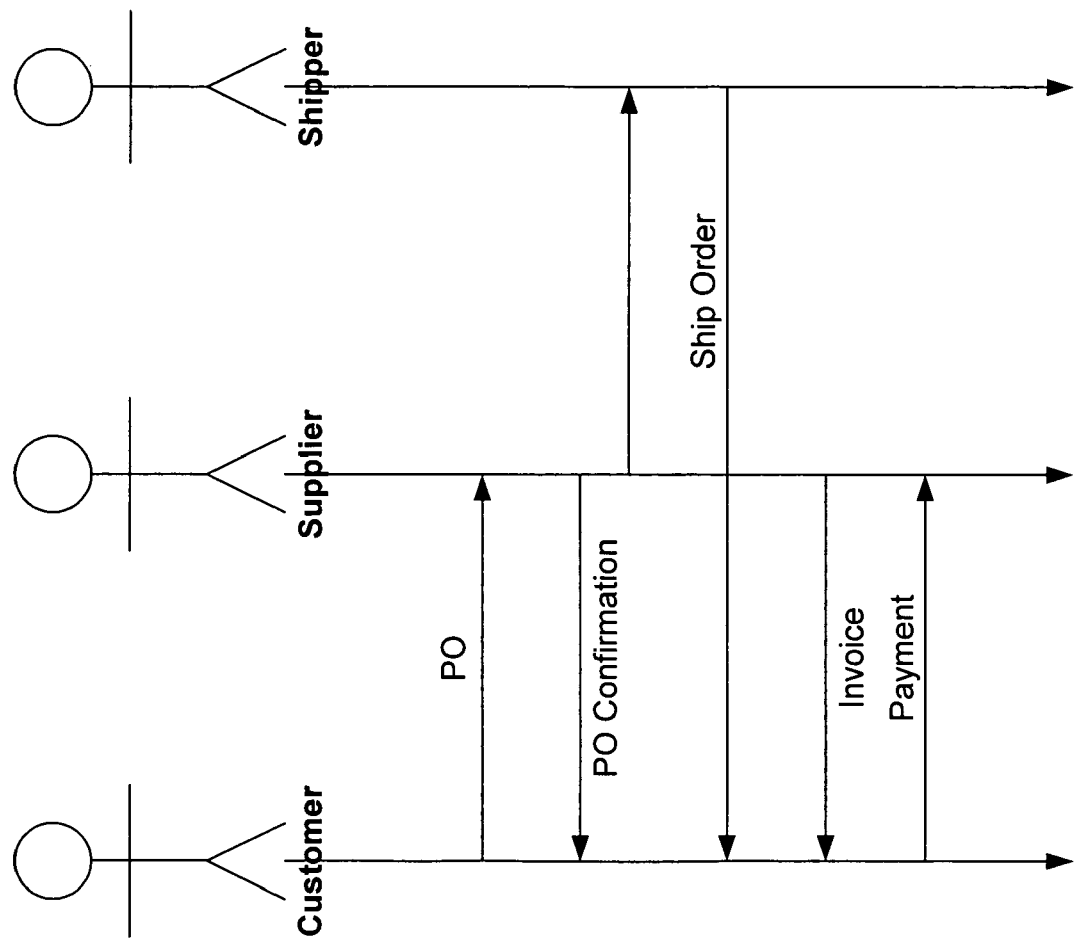

| SLANG | | |
|---|---|---|
| schedule | ::= | header? process? contextRef? |
| header | ::= | portList? messageList? contextList? |
| process | ::= | zero \| sequence \| switch \| map \| copy\| partition \| connect \| cut |
| | | |
| portList | ::= | port* |
| messageList | ::= | message* |
| contextList | ::= | context* |
| | | |
| zero | ::= | zero |
| | | |
| sequence | ::= | genericAction* process? contextRef? |
| genericAction | ::= | silence \| action \| task \| call \| return \| release |
| silence | ::= | silence |
| action | ::= | source \| sink |
| source | ::= | portRef messageRef contextRef? |
| sink | ::= | portRef messageRef contextRerf? |
| task | ::= | action* contextRef? |
| call | ::= | schedRef portRef* messageRef* contextRef? |
| | | |
| switch | ::= | branch* (default process) ? contextRef? |
| branch | ::= | case process |
| case | ::= | ruleRef msgRef msgRef |
| | | |
| map | ::= | process assignmentList? contextRef? |
| assignmentList | ::= | asignment* |
| assignment | ::= | messageRef portRef |
| | | |
| copy | ::= | process contextRef? |
| | | |
| partition | ::= | process* contextRef? |
| | | |
| connect | ::= | process process connectionList contextRef? |
| connectionList | ::= | connection* |
| connection | ::= | portRef portRef |
| | | |
| cut | ::= | process process process contextRef? |

Fig. 6

| Schedule (EBNF) | | |
|---|---|---|
| schedule | ::= | *schedule* name identity header process contextRef? |
| name | ::= | *name* identifier |
| identity | ::= | *guid* GUID |
| header | ::= | *portList* messageList contextList? |
| portList | ::= | *portList* port* |
| messageList | ::= | *messageList* message* |
| contextList | ::= | *contextList* context* |
| scheduleRef | ::= | *scheduleRef* URI |

Fig. 7a

```
Schedule (XML)
<! ELEMENT schedule (header?, (zero | sequence | switch | map
   | copy | partition | connect | cut) ?, contextRef?)>
<! ATTLIST  schedule
   name     ID      #IMPLIED
   guid     CDATA   #IMPLIED>

<! ELEMENT scheduleRef EMPTY>
<! ATTLIST  scheculeRef
   location CDATA #REQUIRED>

<! ELEMENT  header (portList?, messageList?, contextList?)>

<! ELEMENT  portList (port*)>

<! ELEMENT messageList (message*)>

<! ELEMENT contextList (context*)>
```

Fig. 7b

| Example |
|---|
| `<schedule name="mySchedule">`<br>`<header>`<br>   `<portList>`<br>      `<port name="p0">`<br>      `<port name="p1">`<br>   `</portList>`<br>   `<messageList>`<br>      `<message name="m0"/>`<br>      `<message name="m1"/>`<br>   `</messageList>`<br>`</header>`<br>`<!-- The schedule body goes here -->`<br>`</schedule>` |

Fig. 7c

| Port (EBNF) | | |
|---|---|---|
| port | ::= | *port* portName |
| portName | ::= | *identifier* |
| portRef | ::= | *portRef* URI |

Fig. 8a

| Port (XML) |
|---|
| `<!ELEMENT port EMPTY>`<br>`<!ATTLIST  port`<br>   `name        ID     #REQUIRED>`<br><br>`<!ELEMENT  portRef EMPTY>`<br>`<!ATTLIST    portREF`<br>   `location  CDATA  #REQUIRED>` |

Fig. 8b

| Message (EBNF) | | |
|---|---|---|
| message | ::= | *message* messageName |
| messageName | ::= | *identifier* |
| messageRef | ::= | *messageRef* URI |

Fig. 9a

```
Message (XML)
<!ELEMENT message EMPTY>
<!ATTLIST  message
   name      ID     #REQUIRED>

<!ELEMENT messageRef EMPTY>
<!ATTLIST  messageRef
   location  CDATA  #REQUIRED>
```

Fig. 9b

```
Context (EBNF)
context          ::= context contextName transactional?
                     compensated? errorCondition?
contextName      ::= identifier
transactional    ::= transactional
compensated      ::= compensated process?
error Condition  ::= ruleRef messageRef
```

Fig. 10a

```
Context (XML)
<!ELEMENT context (transactional?)>
<!ATTLIST  context
   name      ID     #REQUIRED>

<!ELEMENT transactional (zero | sequence | switch | map
   | copy | partition | connect | cut) ?>

<!ELEMENT contextRef EMPTY>
<!ATTLIST  contextRef
   location  CDATA  #REQUIRED>
```

Fig. 10b

| Action (EBNF) | |
|---|---|
| action | ::= source sink |
| source | ::= *source* portRef messageRef contextRef? |
| sink | ::= *sink* portRef messageRef contextRef? |
Fig. 11a
| Action (XML) | |
|---|---|
| <!ELEMENT sink | (portRef, messageRef, contextRef?)> |
| <!ELEMENT source | (portRef, messageRef, contextRef?)> |
Fig. 11b
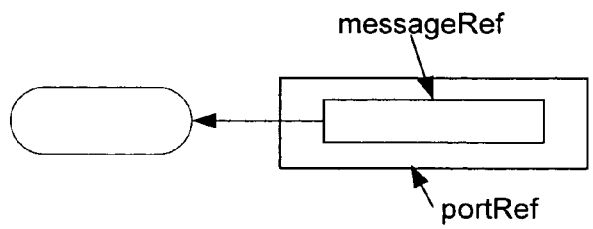
Fig. 11c
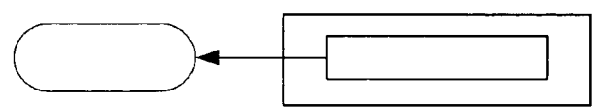
| Process | |
|---|---|
| process | ::= zero \| sequence \| switch \| map \| copy \| partition \| connect \| cut |
Fig. 12

| Zero (EBNF) |
|---|
| zero ::= zero |

Fig. 13a

| Zero (XML) |
|---|
| <!ELEMENT zero EMPTY> |

Fig. 13b

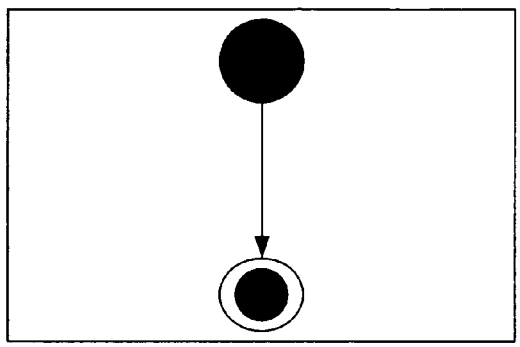

Fig. 13c

| Sequence (EBNF) | |
|---|---|
| sequence | ::= genericAction+ process? contextRef? |
| genericAction | ::= silence \| action \| task \| call \| return \| relese |

Fig. 14a

| Sequence (XML) |
|---|
| <!ELEMENT sequence ( (silence \| sink \| source \| task \| call \| return \| release)*, (zero \| sequence \| switch \| map \| copy \| partition \| connect \| cut) ? )> |
| <!ATTLIST    sequence |
|     ctxt              IDREF  #IMPLIED> |

Fig. 14b

| Example |
|---|
| <sequence><br>  <sink><br>    <portRef location="p0"/><br>    <messageRef location="m0"/><br>  </sink><br>  <source><br>    <portRef location="p1"/><br>    <messageREf location="m1"/><br>  </source><br></sequence> |

| Silence (EBNF) |
|---|
| silence ::= zero |

| Silence (XML) |
|---|
| <!ELEMENT silence EMPTY> |

Task (EBNF)
```
task    ::= action* choice? ctxtRef?
choice  ::= all | any
```

Task (XML)
```
<!ELEMENT task ( ( sink | source)*, contextRef?)>
<!ATTLIST task
   choice  (all / any) "all")
```

Example
```
<task>
   <source>
      <portRef location="p0"/>
      <messageRef location="m0"/>
   </source>
   <source>
      <portRef location="p1"/>
      <message location="m1"/>
   </source>
</task>
```

| Call (EBNF) |
|---|
| call      ::= schedRef portRef* messageRef* contextTef? |

Fig. 17a

| Call (XML) |
|---|
| <!ELEMENT call (scheduleRef, portRef*, messageRef*, contextRef)> |

Fig. 17b

| Return (EBNF) |
|---|
| return      ::= *return* contextRef? |

Fig. 18a

| Return (XML) |
|---|
| <!ELEMENT return (contextRef?)> |

Fig. 18b

| Release (EBNF) |
|---|
| release      ::= release contextRef? |

Fig. 19a

| Release (XML) |
|---|
| <!ELEMENT release (contextRef?)> |

Fig. 19b

| Switch (EBNF) | |
|---|---|
| switch | ::= branch* default? contextRef? |
| branch | ::= case process contextRef? |
| case | ::= *case* ruleRef messageRef messageRef |
| ruleRef | ::= *ruleRef* URI |
| default | ::= *default* process |

Fig. 20a

| Switch (XML) |
|---|
| <! ELEMENT switch (branch* default? contextRef?)> |
| <! ELEMENT branch (case, (zero \| sequence \| switch \| map \| copy \| partition \| connect \| cut), contextRef?)> |
| <! ELEMENT case (ruleRef, messageRef, messageRef)> |
| <! ELEMENT ruleRef EMPTY> <br> <! ATTLIST ruleRef <br>   location CDATA #REQUIRED> |
| <! ELEMENT default (zero \| sequence \| switch \| map \| copy \| partition \| connect \| cut), contextRef?)> |

Fig. 20b

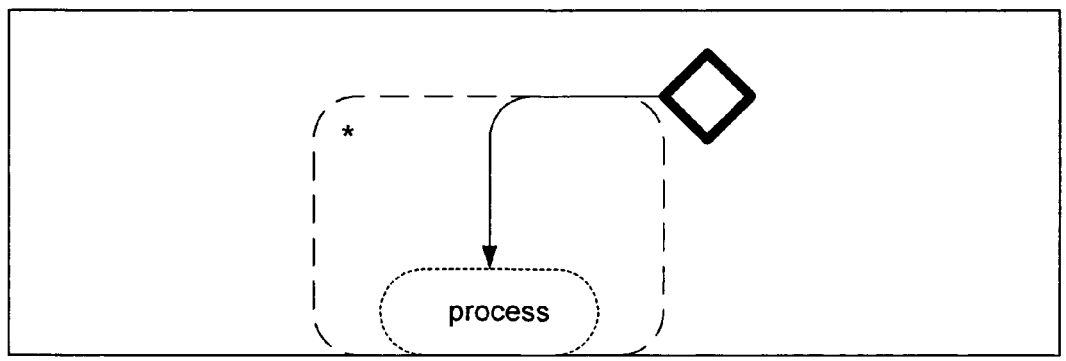

Fig. 20c

| Example |
|---|
| `<schedule name="loopExample">`<br><br>`<header>`<br>`<portList>`<br>   `<port name="p"/>`<br>`</portList>`<br>`<messageList>`<br>   `<message name-"mTrue"/>`<br>   `<message name="m"/>`<br>`</messageList>`<br>`</header>`<br><br>`<switch>`<br>   `<branch>`<br>      `<case>`<br>         `<ruleRef location="test"/>`<br>         `<msgRef location="mTrue"/>`<br>         `<msgRef location="m"/>`<br>      `</case>`<br>      `<sequence>`<br>         `<sink>`<br>            `<portRef location="p"/>`<br>            `<msgRef location="m"/>`<br>         `</sink>`<br>         `<call>`<br>            `<scheduleRef location="loopExample"/>`<br>            `<portRef location="p"/>`<br>         `</call>` |

Fig. 20d

| Map (EBNF) | |
|---|---|
| map | ::= assignmentList process contextRef? |
| assignmentList | ::= *assignmentList* assignment* |
| assignment | ::= *assignment* messageRef portRef |

Fig. 21a

Map (XML)

```
<!ELEMENT map ((zero | sequence | switch | copy |
   partition | connect | cut), assignmentList, contextRef?)>

<!ELEMENT assignmentList (assignment*)>

<!ELEMENT assignment (messageRef, portRef)>
```

Fig. 21b

Example

```
<map>
   <assignmentList>
      <assignment>
         <messageRef location="m0"/>
         <portRef location="p1"/>
      </assignment>
   </assignmentList>
   <sequence>
      <sink>
         <portRef location="p0"/>
         <messageRef location="m0"/>
      </sink>
      <source>
         <portRef location="p1"/>
         <message location="m1"/>
      </source>
   </sequence>
</map>
```

Fig. 21c

| Copy (EBNF) | |
|---|---|
| copy | ::= copy process contextRef? |

Fig. 22a

| Copy (XML) |
|---|
| <!ELEMENT copy ((zero \| sequence \| switch \| map \| copy \| partition \| connect \| cut), contextRef?)> |

Fig. 22b

| Partition (EBNF) | |
|---|---|
| partition | ::= process* contextRef? |

Fig. 23a

| Partition (XML) |
|---|
| <!ELEMENT partition ((zero \| sequence \| switch \| map \| copy \| partition \| connect \| cut)*, contextRef?)> |

Fig. 23b

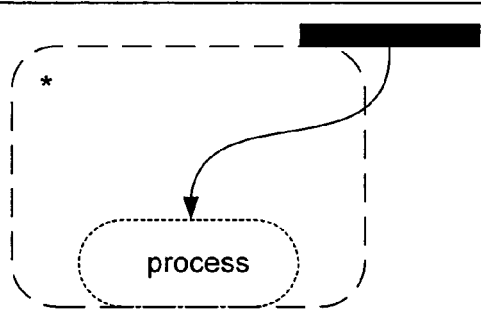

Fig. 23c

| Connect (EBNF) | | |
|---|---|---|
| connect | ::= | process process connectionList contextRef? |
| connectionList | ::= | *connectionList* portRef PortRef |

Fig. 24a

Connect (XML)
<!ELEMENT connect ( (zero | sequence | switch | map | copy |
    partition | connect | cut), (zero | sequence | switch | map |
    copy | partition | connect | cut), connectionList, contextRef?)>

<!ELEMENT connectionList (connection*)>

<!ELEMENT connection (portRef, portRef)>

Fig. 24b

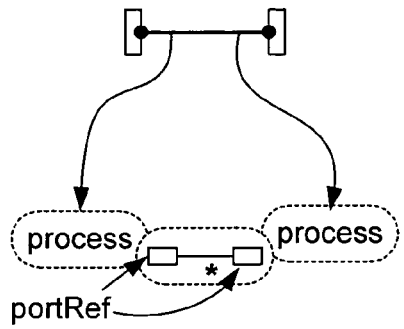

Fig. 24c

Cut (EBNF)
| cut | ::= | process process process contextRef? |

Fig. 25a

Cut (XML)
<!ELEMENT cut ( (zero | sequence | switch | map | copy |
    partition | connect | cut), (zero | sequence | switch | map |
    copy | partition | connect | cut), (zero | sequence | switch |
    map | copy | partition | connect | cut), contextRef?)>

Fig. 25b

```
<map>
  <cut>
    <partition>
      <sequence>
        <sink> <portRef location="x"/> <messageRef location="y"/> </sink>
      </sequence>
      <sequence>
        <source> <portRef location="u"/> <messageRef location-"y"/> </source>
      </sequence>
    </partition>
    <partition>
      <sequence>
        <sink> <portRef location="u"/> messageRef location="y"/> </sink>
      </sequence>
      <sequence>
        <source> <portRef location="z"/> <messageRef location="w"/> </source>
      </sequence>
    </partition
    <sequence>
      <sink> <portRef location="u"/> <messageRef location="v"/> </sink>
    </sequence>
  </cut>
  <assignmentList>
    <assignment>
      <messageRef location="y"/> <portRef location="z"/>
    </assignment>
  </assignmentList>
</map>
```

Fig. 26a

```
<connect>
  <sequence>
    <sink> <portRef loction="x"/> <messageRef location="y"/> </sink>
  </sequence>
  <sequence>
    <source> <portRef location="z"/> <messageRef location="w"/> </source>
  </sequence>
  <connectionList>
    <conection>
      <portRef location="x"/> <portRef location="z"/>
    </connection>
  </connectionList>
</connect?
```

```
01  <schedule name="customer">
02
03  <header>
04    <portList>
05      <port name="pSendPO"/>
06      <port name="pReceiveConf"/>
07      <port name="pReceiveETA"/>
08      <port name="pReceiveInvoice"/>
09      <port name="pSendPayment"/>
10    </portList>
11    <messageList>
12      <message name="mPO"/>
13      <message name="mConf"/>
14      <message name="mETA"/>
15      <message name="mInvoice"/>
16      <message name="mPayment"/>
17    </messageList>
18  </header>
19
20  <sequence>
21    <source> <portRef location="pSendPO"/>
22             <messageRef location="mPO"/> </source>
23    <sink> <portRef location="pReceiveConf"/>
24             <messageRef location="mConf"/> </sink>
25    <task>
26      <sink> <portRef location-"pReceiveETA"/>
27             <messageRef location="mETA"/> </sink>
28      <sink> <portRef location="pReceiveInvoice"/>
29             <messageRef location-"mInvoice"/> </sink>
30    </task>
31    <source> <portRef location="pSendPayment"/>
32             <message location="mPayment"/> </source>
33  </sequence>
34
35  </schedule>
```

Fig. 27b

```
01   <schedule name="supplier">
02
03     <header>
04       <portList>
05         <port name="pReceivePO"/>
06         <port name="pSendconf"/>
07         <port name="pSendShip"/>
08         <port name="pSendInvoice"/>
09         <port name="pReceivePayment"/>
10       </portList>
11       <messageList>
12         <message name="mPO"/>
13         <message name="mConf"/>
14         <message name="mShip"/>
15         <message name="mInvoice"/>
16         <message name="mPayment"/>
17       </messageList>
18     </header>
19
20     <sequence>
21       <sink> <portRef location="pReceivePO"/>
22               <messageRef location="mPO"/> </sink>
23       <source> <portRef location="pSendConf"/>
24               <messageRef location="mConf"/> </source>
25       <source> <portRef location="pSendShip"/>
26               <messageRef location="mShip"/> </source>
27       <source> <portRef location="pSendInvoice"/>
28               <messageRef location="mInvoice"/> </source>
29       <sink> <portRef location="pReceivePayment"/>
30               <messageRef location="mPayment"/> </sink>
31     </sequence>
32
33   </schedule?
```

Fig. 28b

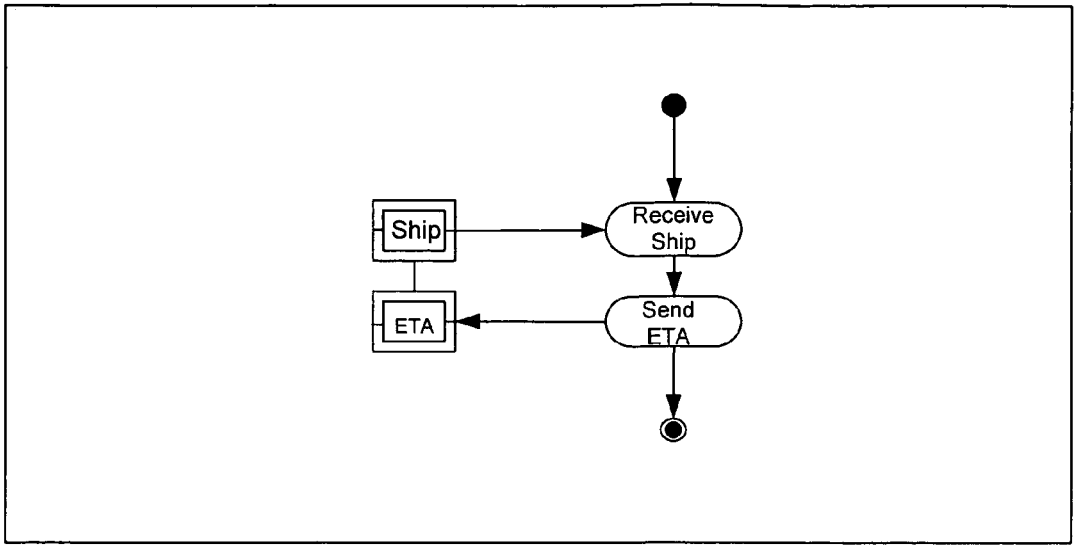

Fig. 29a

```
01    <schedule name="shipper">
02
03    <header>
04      <portList>
05        <port name="pReceiveShip"/>
06        <port name="pSendETA"/>
07      </portList>
08      <messageList>
09        <message name="mShip"/>
10        <message name="mETA"/>
11      <messageList>
12    </header>
13
14    <sequence>
15      <sink> <portRef location="pReceiveShip"/>
16             <messageRef location="mShip"/> </sink>
17      <source> <portRef location="pSendETA"/>
18               <messageRef location="mETZ"/> </source>
19    </sequence>
20
21    </schedule>
```

Fig. 29b

```
01    <schedule name="customerSupplier">
02
03    <header>
04       <portList>
05          <port name="pCustomerPO"/>
06          <port name="pSupplierPO"/>
07          <port name="pCustomerPOConf"/>
08          <port name="pSupplierPOConf"/>
09          <port name="pCustomerETA"/>
10          <port name="pSupplierETA"/>
11          <port name="pCustomerInvoice"/>
12          <port name="pSupplierInvoice"/>
13          <port name="pCustomerPayment"/>
14          <port name="pSupplierPayment"/>
15          <port name="pSupplierShip"/>
16          <port name="pShipperShip"/>
17       </portList>
18    </header>
19
20    <connect>
21       <sequence>
22          <call>  <schedRef location="customer"/>
23                  <portRef location="pCustomerPO"/>
24                  <portRef location="pCustomerPOConf"/>
25                  <portRef location="pCustomerETA"/>
26                  <portRef location="pCustomerInvoice"/>
27                  <portRef location="pCustomerPayment"/>  </call>
28       </sequence>
29       <connect>
30          <sequence>
31             <call>  <schedRef location="supplier"/>
32                     <portRef location="pSupplierPO"/>
33                     <portRef location="pSupplierPOConf"/>
34                     <portRef location="pSupplierShip"/>
35                     <portRef location="pSupplierInvoice"/>
36                     <portRef location="pSupplierPayment"/>  </call>
37          </sequence>
38          <sequence>
39             <call>  <schedRef location="shipper"/>
40                     <portRef location="pShipperShip"/>
41                     <portRef location="pSupplierETA"/>  </call>
42          </sequence>
```

Fig. 30b

```
43      <connectionList>
44          <connection> <portRef location="pSupplierShip"/>
45                       <portRef location="pShipperShip"/> <connection>
46      </connectionList>
47   </connect>
48   <connectionList>
49          <connection> <portRef location="pCustomerPO"/>
50                       <portRef location="pSupplierPO"/> </connection>
51          <connection> <portRef location="pCustomerPOConf"/>
52                       <portRef location="pSupplierPOConf"/> </connection>
53          <connection> <portRef location="pCustomerETZ"/>
54                       <portRef location="pSupplierETA"/> </connection>
55          <connection> <portRef location="PCustomerInvoice"/>
56                       <portRef location="pSupplierInvoice"/> </connection>
57          <connection> <portRef location="pCustomerPayment"/>
58                       <portRef location="pSupplierPayment"/> </connection>
59      </connectionList>
60   </connect>
61
62  </schedule>
```

Fig. 30c

| BANG | | |
|---|---|---|
| binding | ::= | scheduleRef translationHeaderList? schemaList? messageDeclList portBindindingList contextBindingList? ruleBindindingList? callBindingList? |
| translationHeaderList | ::= | translationHeader* |
| schemaList | ::= | schema* |
| messageDeclList | ::= | messageDecl* |
| messageDecl | ::= | messageRef messageTypeRef |
| portBindingList | ::= | portBinding* |
| portBinding | ::= | portRef portTranslation messageBindingList latency? |
| messageBindingList | ::= | messageBinding* |
| messageBinding | ::= | messageRef messageTranslation fieldBindingList latency? |
| fieldBindingList | ::= | fieldBinding* |
| fieldBinding | ::= | fieldRef from? provide? require? portRef? |
| contextBindingList | ::= | contextBinding* |
| contextBinding | ::= | contextRef (retry backoff) ? timeout? |
| ruleBindingList | ::= | ruleBinding* |
| ruleBinding | ::= | ruleRef messageRef messageRef (all \| project matchList) |
| callBindingList | ::= | callBinding* |
| callBinding | ::= | TBD |

Fig. 32

| Binding (EBNF) | | |
|---|---|---|
| binding | ::= | identity? name?<br>scheduleRef<br>translationHeaderList?<br>schemaList?<br>messageDeclList<br>portBindindingList<br>contextBindingList?<br>ruleBindindingList?<br>callBindingList? |

Fig. 33a

| Binding (XML) |
|---|
| <ElementType name="binding" content="eltOnly"><br>  <attribute    type="name"/><br>  <attribute    type="identity"/><br><br>  <group order="seq"><br>    <element type="scheduleRef"/><br>    <element type="translationHeaderList" minOccurs="0" maxOccurs="1"/><br>    <element type="schemaList" minOccurs="0" maxOccurs="1"/><br>    <element type="messageDeclList"/><br>    <element type="portBindingList"/><br>    <element type="contextBindingList" minOccurs="0" maxOccurs="1"/><br>    <element type="ruleBindingList" minOccurs="0" maxOccurs="1"/><br>    <element type="callBindingList" minOccurs="0" maxOccurs="1"/><br>  </group><br></ElementType> |

Fig. 33b

| translationHeader (EBNF) | | |
|---|---|---|
| translationHeaderList | ::= | translationHeader* |
| translationHeader | ::= | *<technology specific content>* |

Fig. 34a

| translationHeader (XML) |
|---|
| <ElementType name="translationHeaderList"><br>  <element type="translationHeader" minOccurs="0" maxOccurs="*"/><br></ElementType><br><br>>ElementType name="translationHeader"/> |

Fig. 34b

| schema (EBNF) |
|---|
| schemaList   : : = schema* |

Fig. 35a

| schema (XML) |
|---|
| <ElementType name="schemaList"/> |

Fig. 35b

| messageDecl (EBNF) | | |
|---|---|---|
| messageDeclList | : : = | messageDecl* |
| messageDecl | : : = | messageDecl messageRef messageTypeRef |
| messageTypeRef | : : = | messageTypeRef URI |

Fig. 36a

```
messageDecl (XML)
<ElementType name="messageDeclList">
   <element type="messageDecl" minOccurs="0" maxOccurs="*"/>
<.ElementType>

<ElementType name="messageDecl" content="eltOnly">
   <group order="seq">
      <element type="messageRef"/>
      <element type="messageTypeRef"/>
   </group>
</ElementType>

<ElementType name="messageTypeRef">
   <attribute type="location"/>
</ElementType>
```

Fig. 36b

| portBinding (EBNF) | | |
|---|---|---|
| portBindingList | : : = | portBinding* |
| portBinding | : : = | portBinding portRef portTranslation messageBindingList latency? |
| portTranslation | : : = | < technology specific content> |

Fig. 37a

```
portBinding  (XML)
<ElementType   name="portBindingList">
   <element type="portBinding" minOccurs="0" maxOccurs="*"/>
</ElementType>

<ElementType   name="portBinding" content="eltOnly">
   <group order="seq">
      <element type="portRef"/>
      <element type="portTranslation"/>
      <element type="messageBindingList"/>
      <element type="latency" minOccurs="0" maxOcurs="1"/>
   </group>
</ElementType>

<ElementType name="portTranslation"/>
```

Fig. 37b

| messageBinding  (EBNF) | | |
|---|---|---|
| messageBindingList | : : = | messageBinding* |
| messageBinding | : : = | *messageBinding messageRef* |
| | | *messageTranslation* |
| | | *fieldBindingList* |
| | | *latency?* |
| messageTranslation | : : = | *<technology specific content>* |

Fig. 38a

```
messageBinding  (XML)
<ElementType name="messageBindingList">
   <element type="messageBinding" minOccurs="0" maxOccurs-"*"/>
</ElementType>

<ElementType name="messageBinding" content="eltOnly">
   <group order="seq">
      <element type="messageRef"/>
      <element type="messageTranslation"/>
      <element type="fieldBindingList"/>
      <element type="latency" minOccurs="0" maxOccurs="1"/>
   </group>
</ElementType>

<ElementType name="messageTranslation"/>
```

Fig. 38b

```
fieldBinding (EBNF)
fieldBindingList      ::=  fieldBinding*
fieldBinding          ::=  fieldBinding fieldRef
                           from? provide? require?
                           portRef?

fieldRef              ::=  fieldRef URI fieldTranslation      ::=  <technology specific content>
```

Fig 39a

```
fieldBinding (XML)
<ElementType name="fieldBindingList">
   <element type="fieldBinding" minOccurs="0" maxOccurs="*"/>
<ElementType>

<ElementType name="fieldBinding" content="eltOnly">
   <group order="seq">
      <element type="fieldRef"/>
      <element type="fieldTranslation"/>
      <element type="from" minOccurs="0" maxOccurs="1"/>
      <element type="provide" minOccurs="0" maxOccurs="1"/>
      <element type="require" minOccurs="0" maxOccurs="1"/>
      <element type="portRef" minOccurs="0" maxOccurs="1"/>
   </group>
<ElementType>

<ElementType name="fieldRef">
   <attribute type="location"/>
</ElementType>

<ElementType name="fieldTranslation"/>
```

Fig. 39b

```
from (EBNF)
from      ::= from fieldRef
```

Fig. 40a

```
from (XML)
<ElementType name="from">
   <element type="fieldRef"/>
<ElementType>
```

Fig. 40b

| provide (EBNF) | | |
|---|---|---|
| provide | ::= | *provide* |

Fig. 41a

| provide (XML) |
|---|
| <ElementType name="provide" content="empty"/> |

Fig. 41b

| require (EBNF) | | |
|---|---|---|
| require | ::= | *require* |

Fig. 42a

| require (XML) |
|---|
| <ElementType name="require" content="empty"/> |

Fig. 42b

| latency (EBNF) | | |
|---|---|---|
| latency | ::= | *latency* time |

Fig. 43a

| latency (XML) |
|---|
| <ElementType name="latency" dt: type="int"/> |

Fig. 43b

| contextBinding (EBNF) | | |
|---|---|---|
| contextBindingList | ::= | *contextBinding\** |
| contextBinding | ::= | *contextBinding contextRef* (retry backoff) ? timeout? |

Fig. 44a

```
contextBinding (XML)
<ElementType name="contextBindingList">
   <element type="contextBinding" minOccurs-"0" maxOccurs="*"/>
<ElementType>

<ElementType name="contextBinding" content="eltOnly">
   <group order="seq">
      <element type="contextRef"/>
      <group order="seq" minOccurs="0" maxOccurs="1">
       <element type="retry"/>
       <element type="backoff"/>
      </group>
       <element type="timeout"/>
   </group>
</ElementType>
```

Fig. 44b

```
retry (EBNF)
retry       : : =  retry count
```

Fig. 45a

```
retry (XML)
<ElementType name="retry" dt: type="int"/>
```

Fig. 45b

```
backoff (EBNF)
backoff     : : =  backoff time
```

Fig. 46a

```
backoff (XML)
<ElementType name="backoff" dt: type="int"/>
```

Fig. 46b

```
Timeout (EBNF)
timeout     : : =  timeout time
```

Fig. 47a

```
Timeout (XML)
<ElementType name="timeout" dt: type="int"/>
```

Fig. 47b

| ruleBinding (EBNF) | | |
|---|---|---|
| ruleBindingList | : : = | ruleBinding* |
| ruleBinding | : : = | ruleRef messageRef messageRef (all \| project matchList) |
| matchList | : : = | match* |
| match | : : = | match fieldRef fieldRef |

Fig. 48a

```
ruleBinding (XML)
<ElementType name="ruleBindingList">
   <element type="ruleBinding" minOccurs="0" maxOccurs="*"/>
</ElementType>

<ElementType name="ruleBinding" content="eltOnly">
   <group order="seq">
      <element type="ruleRef"/>
      <element type="messageRef"/>
      <element type="messageRef"/>
      <group order="one">
      <element type="all"/>
      <group order="seq">
         <element type="project"/>
         <element type="matchList"/>
      </group>
      </group>
   </group>
</ElementType>

<ElementType name="all" content="empty"/>

<ElementType name="project" content="empty"/>

<ElementType name="matchList">
   <element type="match" minOccurs="0" maxOccurs="*"/>
</ElementType>

<ElementType name="match" content="eltOnly">
   <group order="seq">
      <element type="fieldRef"/>
      <element type="fieldRef"/>
   </group>
</ElementType>
```

Fig. 48b

BINDING FOR BUSINESS WORKFLOW PROCESSES

TECHNICAL FIELD

The present invention relates to computer processes, and more particularly to a system and method for binding a business workflow process schedule to specific technologies for use in real world applications.

BACKGROUND OF THE INVENTION

Business to business interaction presents an enormous opportunity for integration and improved efficiency. At the same time, integrating two autonomous businesses in an automated fashion presents several challenges. For example, electronic business communication can require four levels of connectivity. First, the business must be connected by some physical communication media (e.g., phone lines, T1 lines or a wireless connection). Second, both parties must understand the protocol (e.g., TCP/IP) used to communicate over the physical media. Third, businesses must have an agreement as to data both syntactically as well as semantically. Finally, both parties must agree to respond to the data in a pre-determined manner. This includes not only how the data is interpreted, but also the sequence of actions that take place in an interaction between businesses.

Transaction processing systems have lead the way for many ideas in distributed computing and fault-tolerant computing. For example, transaction processing systems have introduced distributed data for reliability, availability, and performance, and fault tolerant storage and processes, in addition to contributing to the client-server model and remote procedure call for distributed computation. Importantly, transaction processing introduced the concept of transaction ACID properties—atomicity, consistency, isolation and durability that has emerged as the unifying concept for distributed computations. Recently, transaction processing systems have been utilized in modeling business workflow systems. This has resulted in the formulation of many business workflow application software systems.

Many applications for workflow tools are internal to a business or organization. With the advent of networked computers and modems, computer systems at remote locations can now easily communicate with one another. This allows computer system workflow applications to be used between remote facilities within a company. Workflow applications can also be of particular utility in processing business transactions between different companies. Automating such processes can result in significant efficiency improvements, not otherwise possible. However, this inter-company application of workflow technology requires co-operation of the companies and proper interfacing of the individual company's existing computer systems.

A fundamental concept of workflow analysis is that many business processes can be interpreted as a sequence of basic transactions called workflows. Workflows have a customer, a performer, and conditions of satisfaction. The customer and performer are roles that participants can take in workflows. In addition, workflows can have observers. In conventional business workflow systems, a transaction comprises a sequence of operations that change recoverable resources and data from one consistent state into another, and if a failure occurs before the transaction reaches normal termination those updates will be rolled back or undone. ACID transactions control concurrency by isolating atomic transitions against each other to create a serializable schedule by delaying updates until committing of transactions. Current business workflow software systems provide scheduling software that requires binding within the scheduling to couple the schedule to real world applications and technologies. The schedule includes code coupling the components of the schedule to application program interface (API) objects and/or server objects for interfacing the schedule with systems within each business or department involved in the business process. These types of schedule software require sophisticated programmers in implementing the software for a given business workflow model. Furthermore, these types of schedule software requires modification of each schedule for different technologies.

Accordingly, there is a strong need in the art for a system and/or method for binding a business workflow process that allows for mitigation of the aforementioned deficiencies.

SUMMARY OF THE INVENTION

The present invention relates to a system and methodology of employing a binding for interfacing a business workflow process executable program to a real world implementation. The binding can be reduced to an application programming language. A preferable programming language utilizes an XML (Extensible Markup Language) syntax. In conventional systems, the business workflow language contains the binding and the binding is specific for the technology being implemented. The use of a business workflow model across different technologies requires modification to the binding tailored to the implemented technology. The present invention allows for separation of the business workflow processes and the binding, so that the same business workflow process can be implemented across a variety of different technologies. The binding maps ports and messages to corresponding units of code and invocations of a particular technology being utilized for the modeling of the business workflow process. This can be accomplished by providing technology specific descriptions within the binding that can be translated by the binding and defining ports and messages to be used by the business workflow process within the binding.

The present invention provides a user with the ability to structure schedule messages, define the relationship of schedule ports to units of code (e.g., COM interfaces and components), define the relationship of schedule actions to invocations (e.g., method calls on COM interfaces), control the flow of data between messages, provide details of schedule conditionals and specify the interaction of the schedule with specific technology behaviors (e.g., COM+ activity semantics). For example, the binding can be used to link a business process to an object, to a messaging system or to a database. Furthermore, the binding can be used to link a business process to a file, to an XML stream or a programmatic call. Ports and messages can be linked to tables or databases without any changes to business process methodology.

In one aspect of the invention a method is provided for associating actions of a business workflow process to at least one technological component. The method comprises the steps of providing an abstract model of the business workflow process, breaking the abstract model into at least one executable representing business operations and using a binding separate from the abstract model to link the at least one executable to the at least one technological component.

In an alternate aspect of the invention a system is provided for facilitating modeling of business processes comprised of a plurality of business operations. The system comprises a computer-readable medium and a plurality of computer-executable files. The plurality of computer-executable files comprises a scheduling component for defining the flow of business operations and a binding component for defining the business operations.

In yet another aspect of the invention a system is provided for facilitating modeling of business processes comprised of a plurality of business operations. The system comprises a computer-readable medium and a plurality of computer-executable files. The plurality of computer-executable files comprises a scheduling component for defining the flow of business operations and a binding component for linking at least one of the business operations to at least one technology component.

In another aspect of the invention, a business process scheduling software is provided. The business process scheduling software comprises a data flow module adapted to allow a user to define the flow of business operations and a binding module adapted to allow a user to define the link between the business operations and other components.

In a further aspect of the invention, a system is provided for modeling of business processes comprised of a plurality of business operations. The system includes means for defining the flow of business operations and means for linking the means for defining the flow of business operations to technological components.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

BRIEF DESCRIPTION OF THE DRAWINGS

FIG. 3 illustrates a UML interaction diagram of a simplified purchase interaction in accordance with one aspect of the present invention.

FIG. 6 illustrates a modeling scheduling language syntax in extended Backus-Naur Form Notation (EBNF) in accordance with one aspect of the present invention.

FIG. 7a illustrates a schedule construct in EBNF notation in accordance with one aspect of the present invention.

FIG. 7b illustrates a schedule construct in XML notation in accordance with one aspect of the present invention.

FIG. 7c illustrates an example of a simple schedule in accordance with one aspect of the present invention.

FIG. 8a illustrates a port construct in EBNF notation in accordance with one aspect of the present invention.

FIG. 8b illustrates a port construct in XML notation in accordance with one aspect of the present invention.

FIG. 9a illustrates a message construct in EBNF notation in accordance with one aspect of the present invention.

FIG. 9b illustrates a message construct in XML notation in accordance with one aspect of the present invention.

FIG. 10a illustrates a contexts construct in EBNF notation in accordance with one aspect of the present invention.

FIG. 10b illustrates a contexts construct in XML notation in accordance with one aspect of the present invention.

FIG. 11a illustrates an action construct in EBNF notation in accordance with one aspect of the present invention.

FIG. 11b illustrates an action construct in XML notation in accordance with one aspect of the present invention.

FIG. 11c illustrates a graphical image representing a sink and a source action construct in accordance with one aspect of the present invention.

FIG. 12 illustrates a process construct in EBNF notation in accordance with one aspect of the present invention.

FIG. 13a illustrates a zero construct in EBNF notation in accordance with one aspect of the present invention.

FIG. 13b illustrates a zero construct in XML notation in accordance with one aspect of the present invention.

FIG. 13c illustrates a graphical image representing a zero construct in accordance with one aspect of the present invention.

FIG. 14a illustrates a sequence construct in EBNF notation in accordance with one aspect of the present invention.

FIG. 14b illustrates a sequence construct in XML notation in accordance with one aspect of the present invention.

FIG. 17a illustrates a call construct in EBNF notation in accordance with one aspect of the present invention.

FIG. 17b illustrates a call construct in XML notation in accordance with one aspect of the present invention.

FIG. 18a illustrates a return construct in EBNF notation in accordance with one aspect of the present invention.

FIG. 18b illustrates a return construct in XML notation in accordance with one aspect of the present invention.

FIG. 19a illustrates a release construct in EBNF notation in accordance with one aspect of the present invention.

FIG. 19b illustrates a release construct in XML notation in accordance with one aspect of the present invention.

FIG. 20a illustrates a switch construct in EBNF notation in accordance with one aspect of the present invention.

FIG. 20b illustrates a switch construct in XML notation in accordance with one aspect of the present invention.

FIG. 20c illustrates a graphical image representing a switch construct in accordance with one aspect of the present invention.

FIG. 20d illustrates implementation of the switch construct in providing a loop function in accordance with one aspect of the present invention.

FIG. 21a illustrates a map construct in EBNF notation in accordance with one aspect of the present invention.

FIG. 21b illustrates a map construct in XML notation in accordance with one aspect of the present invention.

FIG. 21c illustrates implementation of a map construct in a schedule in accordance with one aspect of the present invention.

FIG. 22a illustrates a map construct in EBNF notation in accordance with one aspect of the present invention.

FIG. 22b illustrates a map construct in XML notation in accordance with one aspect of the present invention.

FIG. 23a illustrates a partition construct in EBNF notation in accordance with one aspect of the present invention.

FIG. 23b illustrates a partition construct in XML notation in accordance with one aspect of the present invention.

FIG. 23c illustrates a graphical image representing a partition construct in accordance with one aspect of the present invention.

FIG. 24a illustrates a connect construct in EBNF notation in accordance with one aspect of the present invention.

FIG. 24b illustrates a connect construct in XML notation in accordance with one aspect of the present invention.

FIG. 24c illustrates a graphical image representing a connect construct in accordance with one aspect of the present invention.

FIG. 25a illustrates a cut construct in EBNF notation in accordance with one aspect of the present invention.

FIG. 25b illustrates a cut construct in XML notation in accordance with one aspect of the present invention.

FIG. 26a illustrates an example of connecting ports using a cut expression in a schedule in accordance with one aspect of the present invention.

FIG. 27b illustrates a customer business workflow schedule of the workflow process in FIG. 27a written in SLANG syntax in accordance with one aspect of the present invention.

FIG. 28b illustrates a supplier business workflow schedule of the workflow process in FIG. 28a written in SLANG syntax in accordance with one aspect of the present invention.

FIG. 29a illustrates a graphical representation of a shipper business workflow process in accordance with one aspect of the present invention.

FIG. 29b illustrates a shipper business workflow schedule of the workflow process in FIG. 28a written in SLANG syntax in accordance with one aspect of the present invention.

FIGS. 30b-30c illustrates a combined business workflow schedule of the workflow process in FIG. 30a written in SLANG syntax in accordance with one aspect of the present invention.

FIG. 32 illustrates a modeling binding language syntax in extended Backus-Naur Form Notation (EBNF) in accordance with one aspect of the present invention.

FIG. 33a illustrates a binding construct in EBNF notation in accordance with one aspect of the present invention.

FIG. 33b illustrates a binding construct in XML notation in accordance with one aspect of the present invention.

FIG. 34a illustrates a translationHeader construct in EBNF notation in accordance with one aspect of the present invention.

FIG. 34b illustrates a translationHeader construct in XML notation in accordance with one aspect of the present invention.

FIG. 35a illustrates a schema construct in EBNF notation in accordance with one aspect of the present invention;

FIG. 35b illustrates a schema construct in XML notation in accordance with one aspect of the present invention.

FIG. 36a illustrates a messageDec1 construct in EBNF notation in accordance with one aspect of the present invention.

FIG. 36b illustrates a messageDec1 construct in XML notation in accordance with one aspect of the present invention.

FIG. 37a illustrates a portBinding construct in EBNF notation in accordance with one aspect of the present invention.

FIG. 37b illustrates a portBinding construct in XML notation in accordance with one aspect of the present invention.

FIG. 38a illustrates a messageBinding construct in EBNF notation in accordance with one aspect of the present invention.

FIG. 38b illustrates a messageBinding construct in XML notation in accordance with one aspect of the present invention.

FIG. 39a illustrates a fieldBinding construct in EBNF notation in accordance with one aspect of the present invention.

FIG. 39b illustrates a fieldBinding construct in XML notation in accordance with one aspect of the present invention.

FIG. 40a illustrates a from construct in EBNF notation in accordance with one aspect of the present invention.

FIG. 40b illustrates a from construct in XML notation in accordance with one aspect of the present invention.

FIG. 41a illustrates a provide construct in EBNF notation in accordance with one aspect of the present invention.

FIG. 41b illustrates a provide construct in XML notation in accordance with one aspect of the present invention.

FIG. 42a illustrates a require construct in EBNF notation in accordance with one aspect of the present invention.

FIG. 42b illustrates a require construct in XML notation in accordance with one aspect of the present invention.

FIG. 43a illustrates a latency construct in EBNF notation in accordance with one aspect of the present invention.

FIG. 43b illustrates a latency construct in XML notation in accordance with one aspect of the present invention.

FIG. 44a illustrates a contextBinding construct in EBNF notation in accordance with one aspect of the present invention.

FIG. 44b illustrates a contextBinding construct in XML notation in accordance with one aspect of the present invention.

FIG. 45a illustrates a retry construct in EBNF notation in accordance with one aspect of the present invention.

FIG. 45b illustrates a retry construct in XML notation in accordance with one aspect of the present invention.

FIG. 46a illustrates a backoff construct in EBNF notation in accordance with one aspect of the present invention.

FIG. 46b illustrates a backoff construct in XML notation in accordance with one aspect of the present invention.

FIG. 47a illustrates a timeout construct in EBNF notation in accordance with one aspect of the present invention.

FIG. 47b illustrates a timeout construct in XML notation in accordance with one aspect of the present invention.

FIG. 48a illustrates a ruleBinding construct in EBNF notation in accordance with one aspect of the present invention and FIG. 48b illustrates a ruleBinding construct in XML notation in accordance with one aspect of the present invention.

DETAILED DESCRIPTION OF THE INVENTION

Figure 1A:
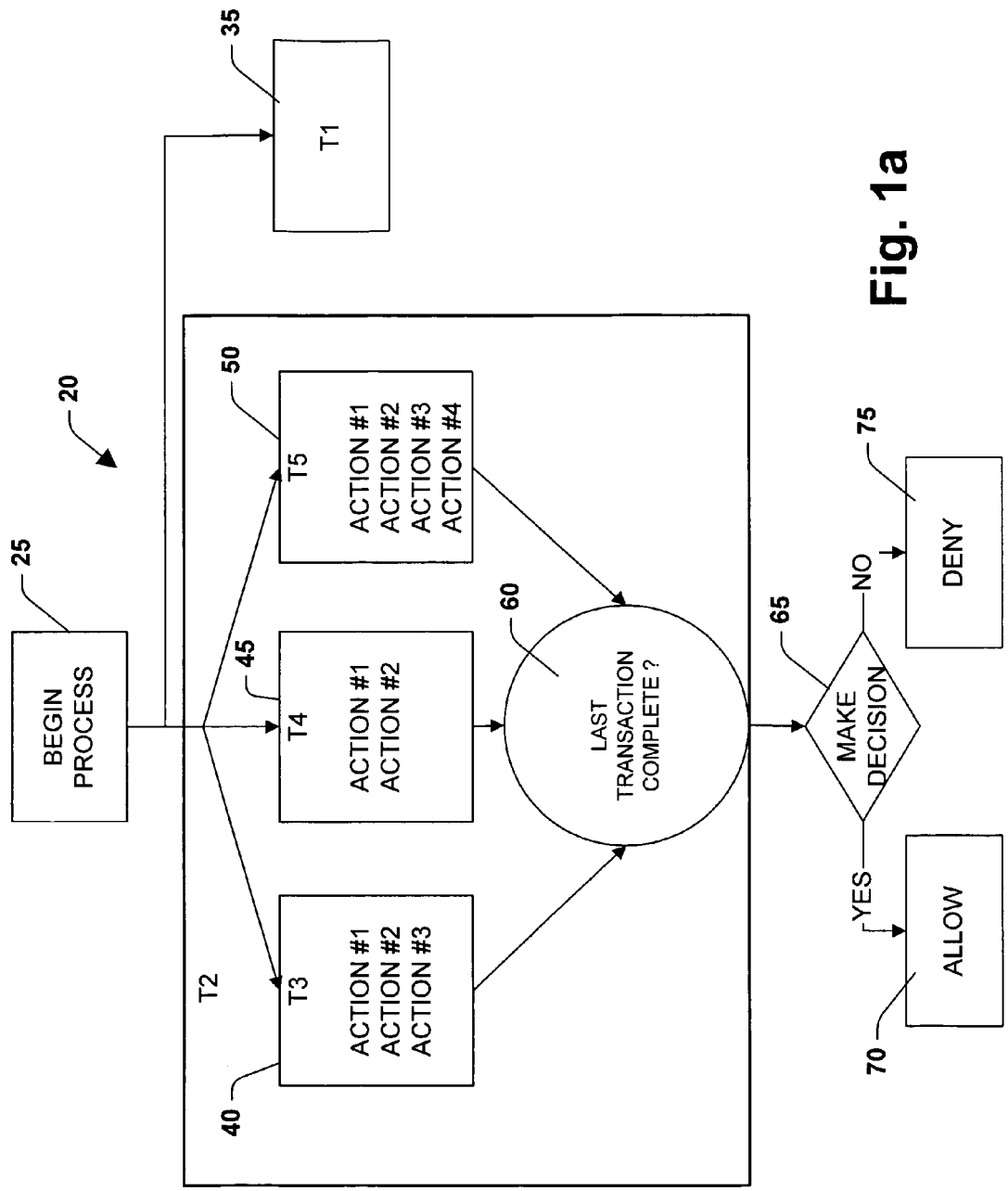
FIG. 1a illustrates a block diagram of a business workflow model in accordance with one aspect of the present invention.

The present invention is now described with reference to the drawings, wherein like reference numerals are used to refer to like elements throughout. The present invention is described with reference to a system and method for binding a business workflow process schedule to a technology specific application. The system and method employs an XML syntax to create a binding for binding a business workflow schedule to application program interfaces, such as common object model (COM) interfaces, through a separate binding file, such that a common business workflow model can be implemented in connection with a variety of business workflow technologies. The present example includes creating a scheduling file based on a particular business process model reduced to XML syntax and creating a separate binding file in XML syntax for binding that model to applications within a business. Although the binding is described with respect to a file, the binding can be represented by things other than a file, such as through a database or programmatically. It is to be appreciated that although the business workflow model described is particularly useful in business workflow processes, a variety of models can be employed and bound to business applications by the binding of the present invention.

FIG. 1a illustrates a flow diagram of a business process 20 employing the model of the present invention. In step 25, the process begins and divides into an independent business transaction (T1) 35 and an interdependent business transaction (T2) 30. A transaction may include a single action in a business operation, a single business operation or a number of business operations in a business process. The model allows for explicit separation of independent business transaction (T1) 35 from the interdependent business transaction (T2) 30. Although independent transaction (T1) 35 and interdependent transaction (T2) 30 can be executed concurrently, the model allows for independent transactions to be executed on machines separated and isolated from the machine utilized to execute interdependent transactions, because interdependent transactions do not require information regarding results of independent transactions. Therefore, significant throughput and decreased latency of a business process is achieved employing the model of the present invention.

Interdependent transaction (T2) 30 is a parent transaction and includes interdependent child transaction (T3) 40, interdependent child transaction (T4) 45 and interdependent child transaction (T5) 50, which execute concurrently. Interdependent parent transaction (T2) 30 does not commit until the last of the concurrent child interdependent transactions 40, 45 and 50 commit. Therefore, the committing of the interdependent parent transaction (T2) 30 is not dependent on the communication between the concurrent child interdependent transactions as is conventional, but commits after the last concurrent child interdependent transaction commits, again resulting in decreased latency of the business process. Conventional systems isolate concurrent interdependent transactions from one another such that each transaction views other concurrent interdependent transactions as committing before or after the viewing transaction (e.g., sequential). The present model loosens isolation, such that committing of concurrent interdependent transactions occurs after a final concurrent interdependent transaction has committed, thus providing another level of parallelism (e.g., communicating parallelism). After each concurrent interdependent transaction commits, data is transferred to step 60 which determines whether or not the last transaction has committed. Upon commitment of the last concurrent interdependent transaction, the parent interdependent transaction (T2) 30 commits and the data is transferred concurrently to step 65. At step 65, the business process 20 determines whether a decision is allowed (Yes) in step 70 or denied (No) in step 75 based on the transmitted data.

In addition to the above stated features, the model allows for concurrent execution of actions within transactions. Transactions will not commit until a final action within a transaction has completed. The model also allows for explicit determination of transaction boundaries in addition to increased granularity of transactions. For example, transaction (T5) 50 has been defined as having four actions, while transaction (T3) 40 and (T4) 45 has been defined as including three and four actions, respectively. Transaction (T2) 30 has been defined as including transaction (T3) 40, (T4) 45 and (T5) 50, but can be defined as any two of transaction (T3) 40, (T4) 45 and (T5) 50 or simply any of transaction (T3) 40, (T4) 45 and (T5) 50. Therefore, the present invention allows for defining transaction boundaries and increasing granularity. Additionally, actions can happen concurrently independent of isolation because the data that the actions work on are independent of one another. Since isolation of the model has been relaxed to allow for increased granularity, transactions cannot simply be rolled back upon a failure of a single transaction, as is conventional. This is because the data associated with committed interdependent transactions is not locked after commitment, and therefore data may be compromised before another concurrent interdependent transaction fails. Therefore, the present invention allows for compensation to be invoked upon a failure of a transaction or an action. The compensation can be invoked to include compensating tasks for committed interdependent concurrent transactions and all committed transactions and actions outside the parent transaction. However, compensation upon a failure can include any compensating action to be invoked based on a particular application or desire.

Figure 1B:
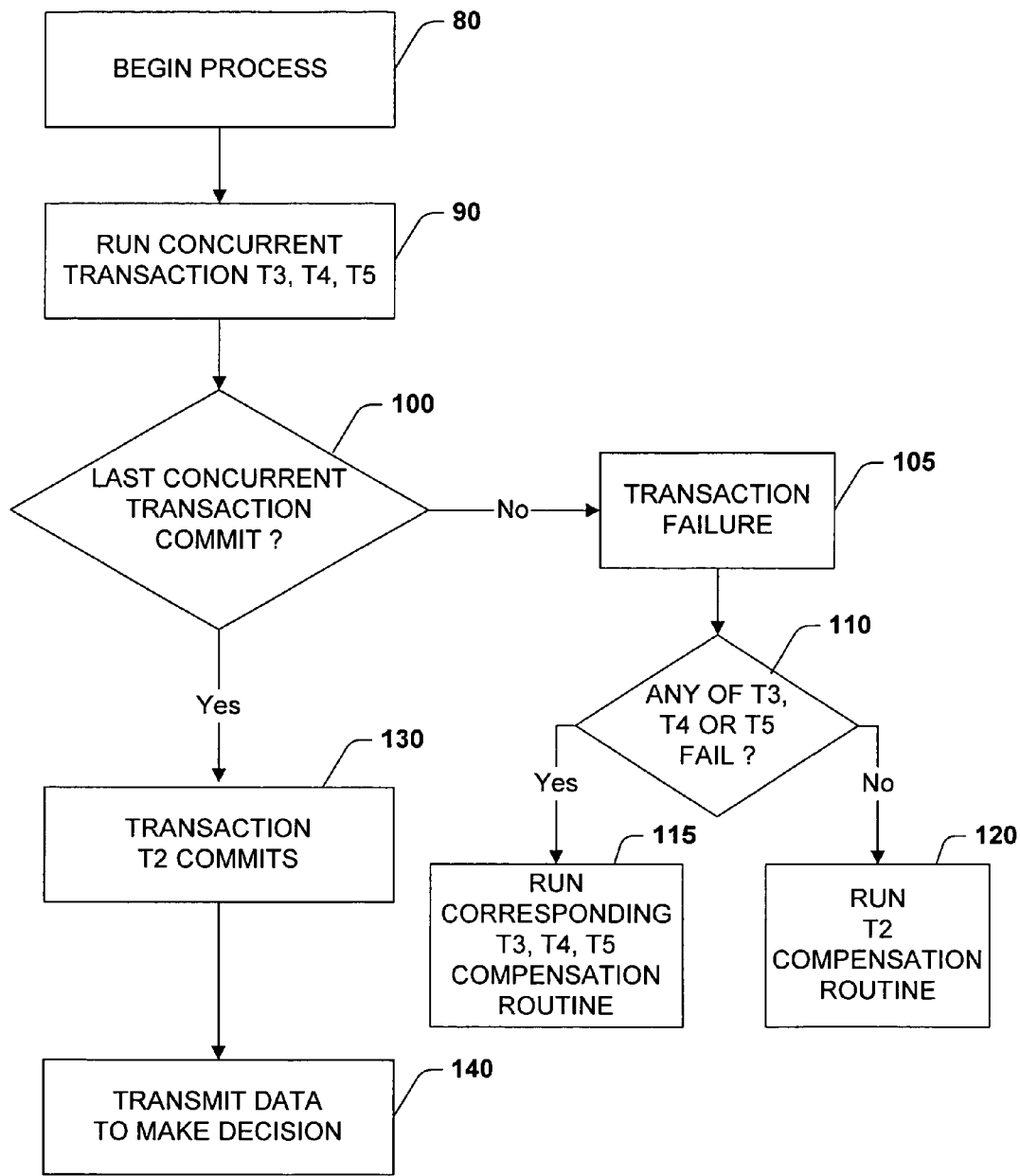
FIG. 1b is a flow chart illustrating a compensation routine in accordance with one aspect of the present invention.

FIG. 1b illustrates invocation of a compensation routine upon a failure of any of concurrent child interdependent transactions (T3) 40, (T4) 45 and (T5) 50 of interdependent parent transaction (T2) 30. At step 80, the interdependent parent transaction (T2) 30 begins executing in the business process 20. At step 90, the concurrent child interdependent transactions (T3) 40, (T4) 45 and (T5) 50 begin execution. The business process then waits for a last concurrent interdependent child transaction to commit at step 100. If all three concurrent child interdependent transactions commit (Yes), the business process advances to step 130 and interdependent parent transaction (T2) 30 commits. The data is then transmitted to a decision maker at step 140. If all three concurrent child interdependent transactions do not commit (No) at step 100, there is a transaction failure with respect to interdependent parent transaction (T2) 30 at step 105. The business process then determines if any of the concurrent child interdependent transactions (T3) 40, (T4) 45 and (T5) 50 have failed at step 110. If one of the concurrent child interdependent transactions (T3) 40, (T4) 45 and (T5) 50 has failed (Yes), a compensation routine is run for the particular failed transaction at step 115. If one of the concurrent child interdependent transactions (T3) 40, (T4) 45 and (T5) 50 has not failed (No), a compensation routine is run with respect to the interdependent parent transaction (T2) 30 at step 120. It is to be appreciated that parent transaction can call compensators within the child transaction or call its own compensators, as a result of a failure. Additionally, calls can be made from the failed transaction and compensation made based on information within the committed transactions. The compensation information may come from a logged database. Since isolation has been loosened with respect to the parent transaction, only data of a child transaction will be locked during execution. Therefore, once the child transaction commits, the failed transaction can access data with respect to any committed transaction.

Figure 1C:
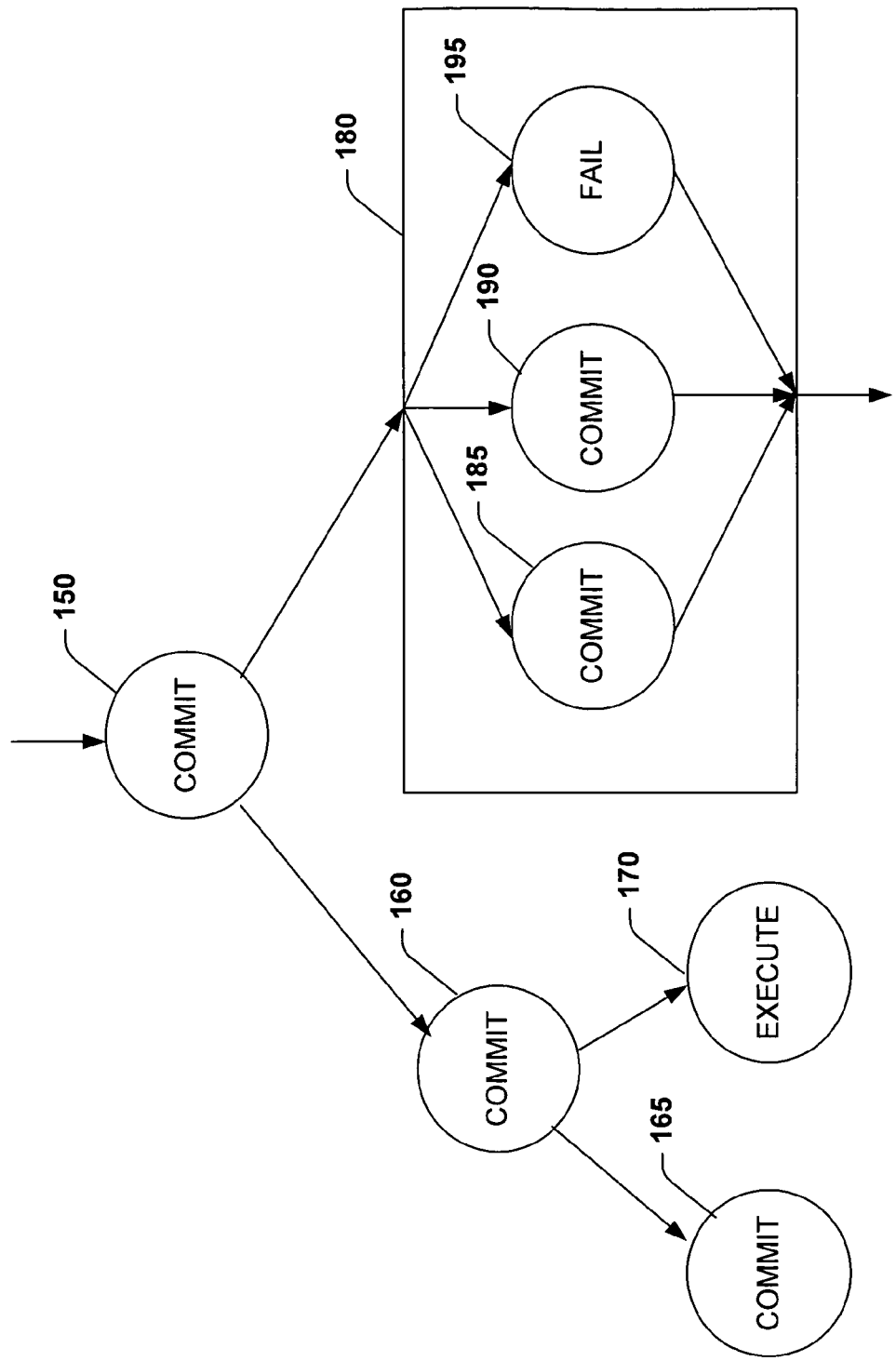
FIG. 1c is a flow chart illustrating a multiple transaction flow in accordance with one aspect of the present invention.

FIG. 1*b* illustrates compensation of committed interdependent child transactions as a result of a failure of another interdependent child transaction. It is to be appreciated that compensation is also necessary for transactions outside the parent transaction. For example, FIG. 1*c* illustrates a first transaction 150 committing and dividing into a transaction 160 and an interdependent parent transaction 180. The transaction 160 then commits and divides into transaction 165 and transaction 170. The concurrent interdependent child transactions 185, 190 and 195 begin executing concurrently. In addition, transactions 160, 165 and 170 outside parent transaction 180 begin executing. If during execution, transaction 195 fails, interdependent transactions 185 and 190 that have committed will need compensation. Additionally, transaction 160, 165 and 170 outside parent transaction 180 will need compensation up to a state of the system right after the transaction 150 committed.

The model of the present invention can be reduced to a programming language. A schedule of a workflow process flow employing features of the model can be written in the programming language. The schedule technology can describe a dataflow diagram where actions are connected via data flowing between them. The actions can be defined as virtual ports and messages received between the ports representing business operations. A binding component can map to invocations on COM objects, messages in queues, or other technology components. Different binding components can be employed for utilizing the same schedule across a variety of business implementations. The messages, action connections and mapping are defined in a binding file separate from the schedule.

Figure 1D:
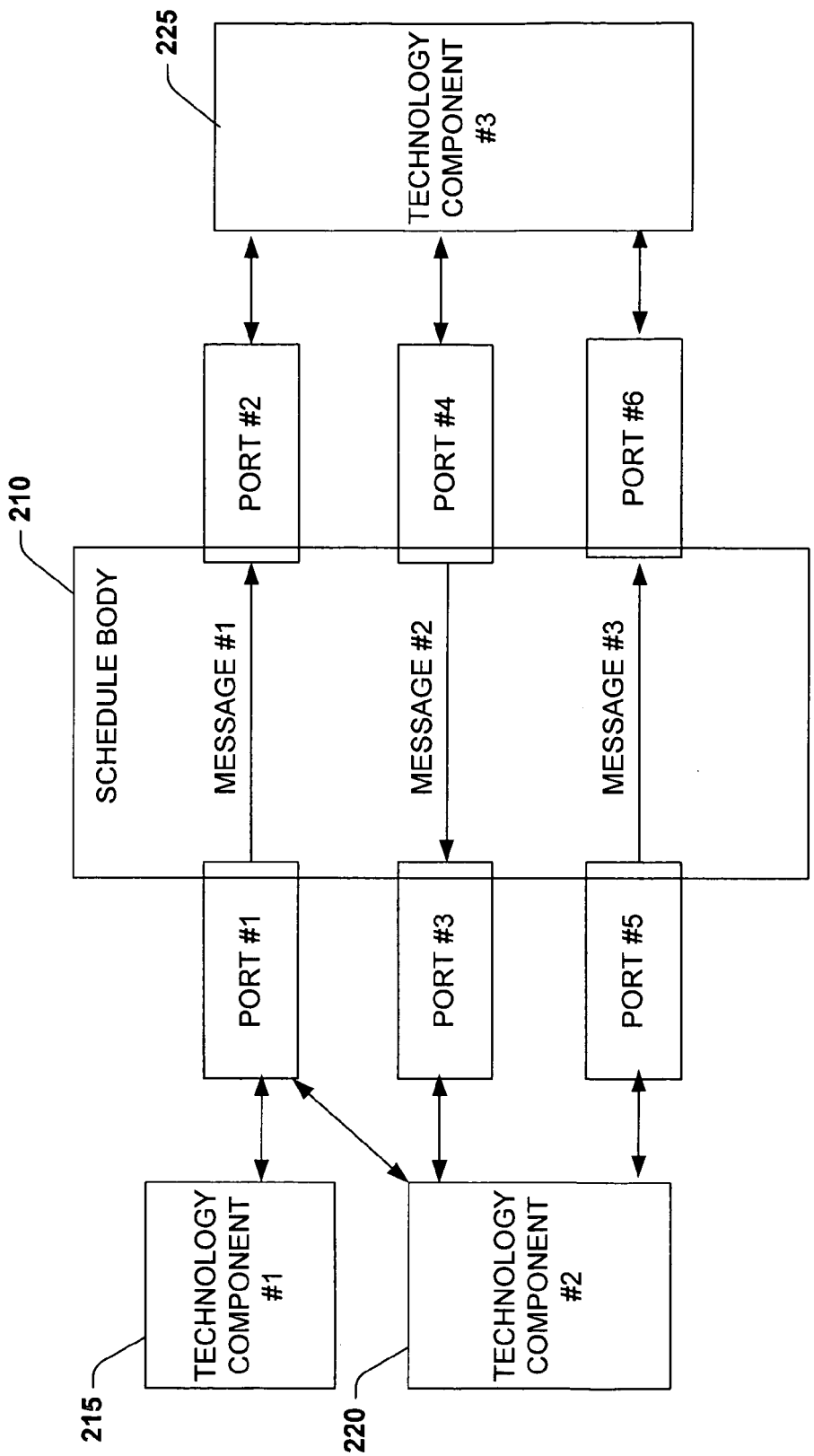
FIG. 1d illustrates a block diagram of a schedule interfacing to various technology components in accordance with one aspect of the present invention.

As previously stated, the schedule defines the flow of the business process, while the binding defines the schedule messages, port connections and port and message interfaces with components outside the schedule. FIG. 1*d* illustrates an example of a schedule body 210 controlling messages being exchanged between ports. The ports and messages also interface with components outside the schedule body. For example, Port #1 interfaces with first technology component 215 and a second technology component 220, port #3 and port #5 both interface with the second technology component 220, and port #2, port #4 and port #6 interface with a third technology component 225. The binding defines message structures, the port connections and the port and message interface with the interface components. The interface components can be objects, messaging systems, databases, files, XML streams or programmatic call. During runtime, a port can be thought of as an alias for a component instance, and references to the port are resolved to references to the interface component via the binding. This abstraction allows the representation of schedule behavior without specifying the particular technological components that implement the behavior. For example, the same port might be bound to different technological components (e.g, MSMQ vs. COM). A port used to represent a COM object can be used as an alias for an instance of a particular class and a specific interface. Ports can be either active or passive. Active actions are used to drive method calls on components. A typical active action will instantiate a component, call a method on the instance, and release the reference to the instance if it is not used later in the schedule. Passive actions are used to send externally originating "stimuli" to a schedule. Passive actions may take the form of an event, with a running schedule acting as a subscriber. Passive actions allow external programs to advance the schedule state.

Figure 1E:
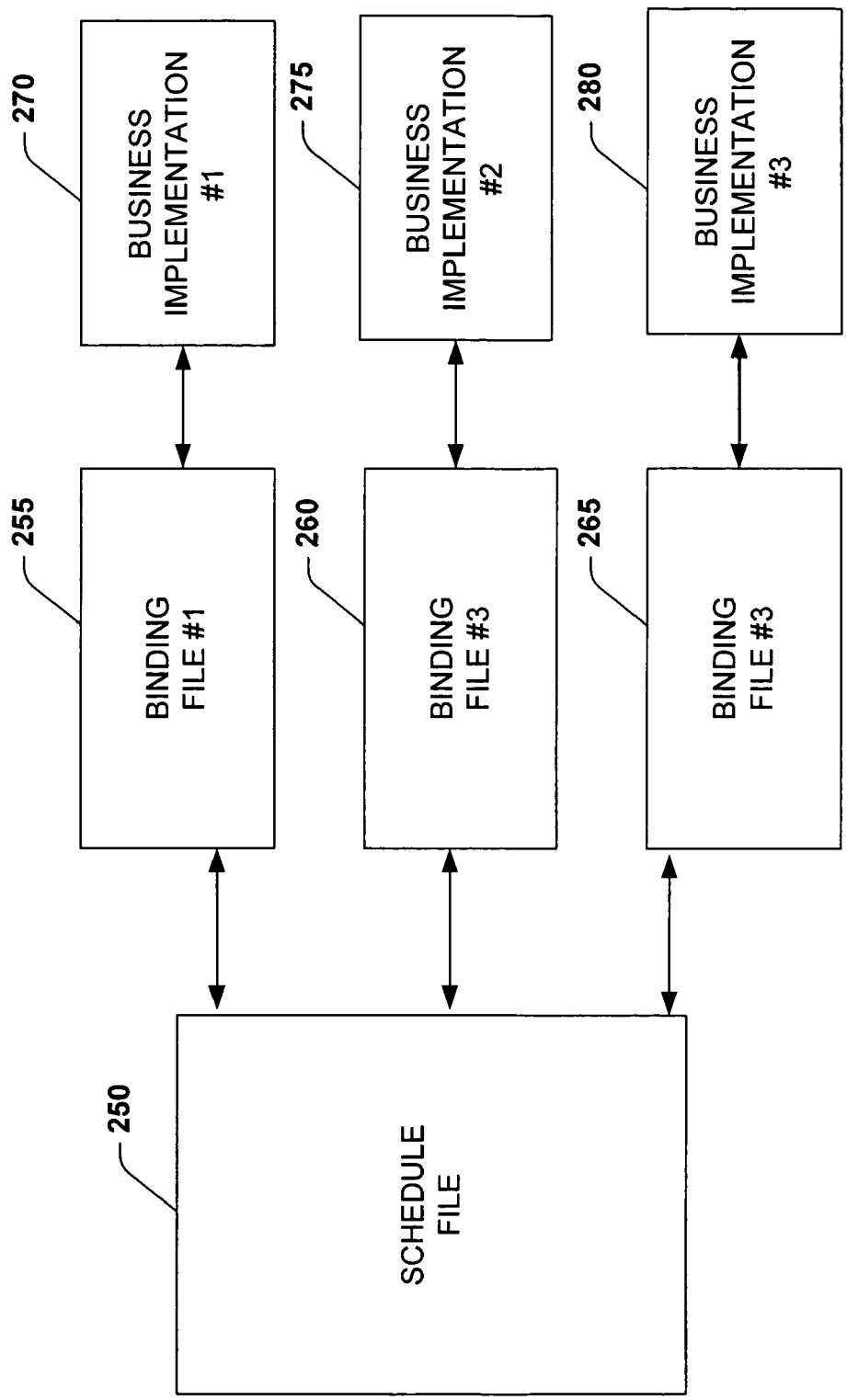
FIG. 1e illustrates a block diagram of a schedule binding to various business implementations in accordance with one aspect of the present invention.

The binding mechanism provides a layer of abstraction for separating the schedule from implementations of the workflow. The binding layer is responsible for mapping actions in the schedule to actual calls on components. In this way, the same schedule can be reimplemented using a different set of technological components or another business implementation altogether. For example, FIG. 1*e* illustrates utilizing a single schedule file 250 with different business implementations by utilizing separate binding files. A first binding file 255 couples the schedule 250 to a first business implementation 270, a second binding file 260 couples the schedule 250 to a second business implementation 275 and a third binding file 265 couples the schedule 250 to a third business implementation 285. During execution, each binding to a schedule creates an instance of that schedule that can be executed concurrently with other schedules. Additionally, each binding file can bind a number of actions within a schedule to different technological components by creating instances of each action and each component connection. Separate binding files can be utilized for binding to different technology components in the same business implementation, the same technology components in different business implementations or different technology components in different business implementations for the same schedule.

Figure 2A:
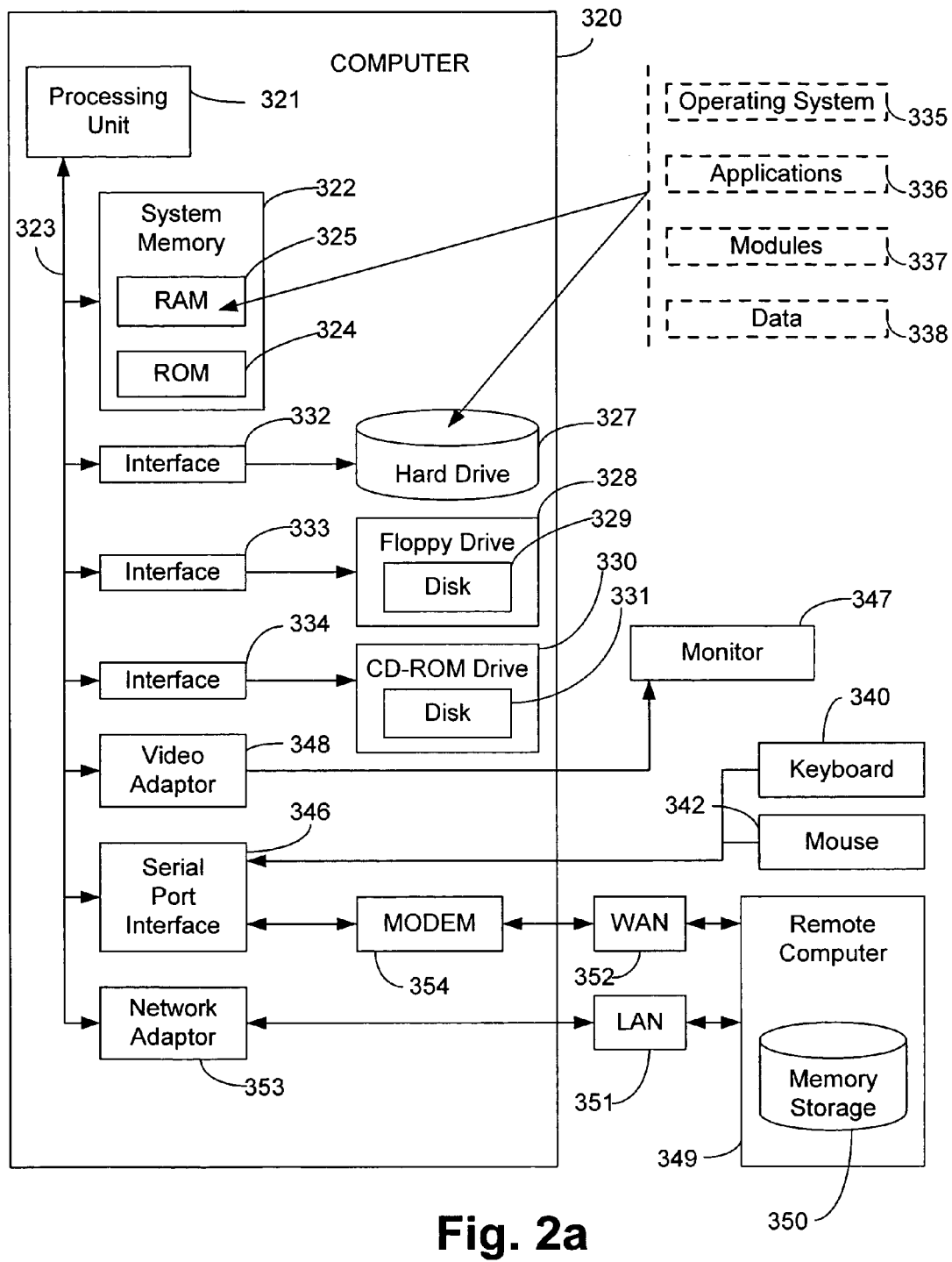
FIG. 2a illustrates a block diagram of a computer system in accordance with an environment of the present invention.

FIG. 2*a* and the following discussion are intended to provide a brief, general description of a suitable computing environment in which the invention may be implemented. While the invention will be described in the general context of computer-executable instructions of a computer program that runs on a server computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including single- or multi-processor computer systems, minicomputers, mainframe computers, as well as personal computers, hand-held computing devices, microprocessor-based or programmable consumer electronics, and the like. The illustrated embodiment of the invention also is practiced in distributed computing environments where tasks are performed by remote processing devices that are linked through a communications network. But, some embodiments of the invention can be practiced on stand-alone computers. In a distributed computing environment, program modules may be located in both local and remote memory storage devices.

With reference to FIG. 2a, an exemplary system for implementing the invention includes a conventional server computer 320, including a processing unit 321, a system memory 322, and a system bus 323 that couples various system components including the system memory to the processing unit 321. The processing unit may be any of various commercially available processors, including Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 321.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 324 and random access memory (RAM) 325. A basic input/output system (BIOS), containing the basic routines that help to transfer information between elements within the server computer 320, such as during start-up, is stored in ROM 324.

The server computer 320 further includes a hard disk drive 327, a magnetic disk drive 328, e.g., to read from or write to a removable disk 329, and an optical disk drive 330, e.g., for reading a CD-ROM disk 331 or to read from or write to other optical media. The hard disk drive 327, magnetic disk drive 328, and optical disk drive 330 are connected to the system bus 323 by a hard disk drive interface 332, a magnetic disk drive interface 333, and an optical drive interface 334, respectively. The drives and their associated computer-readable media provide nonvolatile storage of data, data structures, computer-executable instructions, etc. for the server computer 320. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 325, including an operating system 335, one or more application programs 336, other program modules 337, and program data 338. The operating system 335 in the illustrated server computer is the Microsoft Windows NT Server operating system, together with the before mentioned Microsoft Transaction Server.

A user may enter commands and information into the server computer 320 through a keyboard 340 and pointing device, such as a mouse 342. Other input devices (not shown) may include a microphone, joystick, game pad, satellite dish, scanner, or the like. These and other input devices are often connected to the processing unit 321 through a serial port interface 346 that is coupled to the system bus, but may be connected by other interfaces, such as a parallel port, game port or a universal serial bus (USB). A monitor 347 or other type of display device is also connected to the system bus 323 via an interface, such as a video adapter 348. In addition to the monitor, server computers typically include other peripheral output devices (not shown), such as speakers and printers.

The server computer 320 may operate in a networked environment using logical connections to one or more remote computers, such as a remote client computer 349. The remote computer 349 may be a workstation, a server computer, a router, a peer device or other common network node, and typically includes many or all of the elements described relative to the server computer 320, although only a memory storage device 350 has been illustrated in FIG. 2a. The logical connections depicted in FIG. 2a include a local area network (LAN) 351 and a wide area network (WAN) 352. Such networking environments are commonplace in offices, enterprise-wide computer networks, intranets and the Internet.

When used in a LAN networking environment, the server computer 320 is connected to the local network 351 through a network interface or adapter 353. When used in a WAN networking environment, the server computer 320 typically includes a modem 354, or is connected to a communications server on the LAN, or has other means for establishing communications over the wide area network 352, such as the Internet. The modem 354, which may be internal or external, is connected to the system bus 323 via the serial port interface 346. In a networked environment, program modules depicted relative to the server computer 320, or portions thereof, may be stored in the remote memory storage device. It will be appreciated that the network connections shown are exemplary and other means of establishing a communications link between the computers may be used.

In accordance with practices of persons skilled in the art of computer programming, the present invention is described below with reference to acts and symbolic representations of operations that are performed by the server computer 320, unless indicated otherwise. Such acts and operations are sometimes referred to as being computer-executed. It will be appreciated that the acts and symbolically represented operations include the manipulation by the processing unit 321 of electrical signals representing data bits which causes a resulting transformation or reduction of the electrical signal representation, and the maintenance of data bits at memory locations in the memory system (including the system memory 322, hard drive 327, floppy disks 329, and CD-ROM 331) to thereby reconfigure or otherwise alter the computer system's operation, as well as other processing of signals. The memory locations where data bits are maintained are physical locations that have particular electrical, magnetic, or optical properties corresponding to the data bits.

Figure 2B:
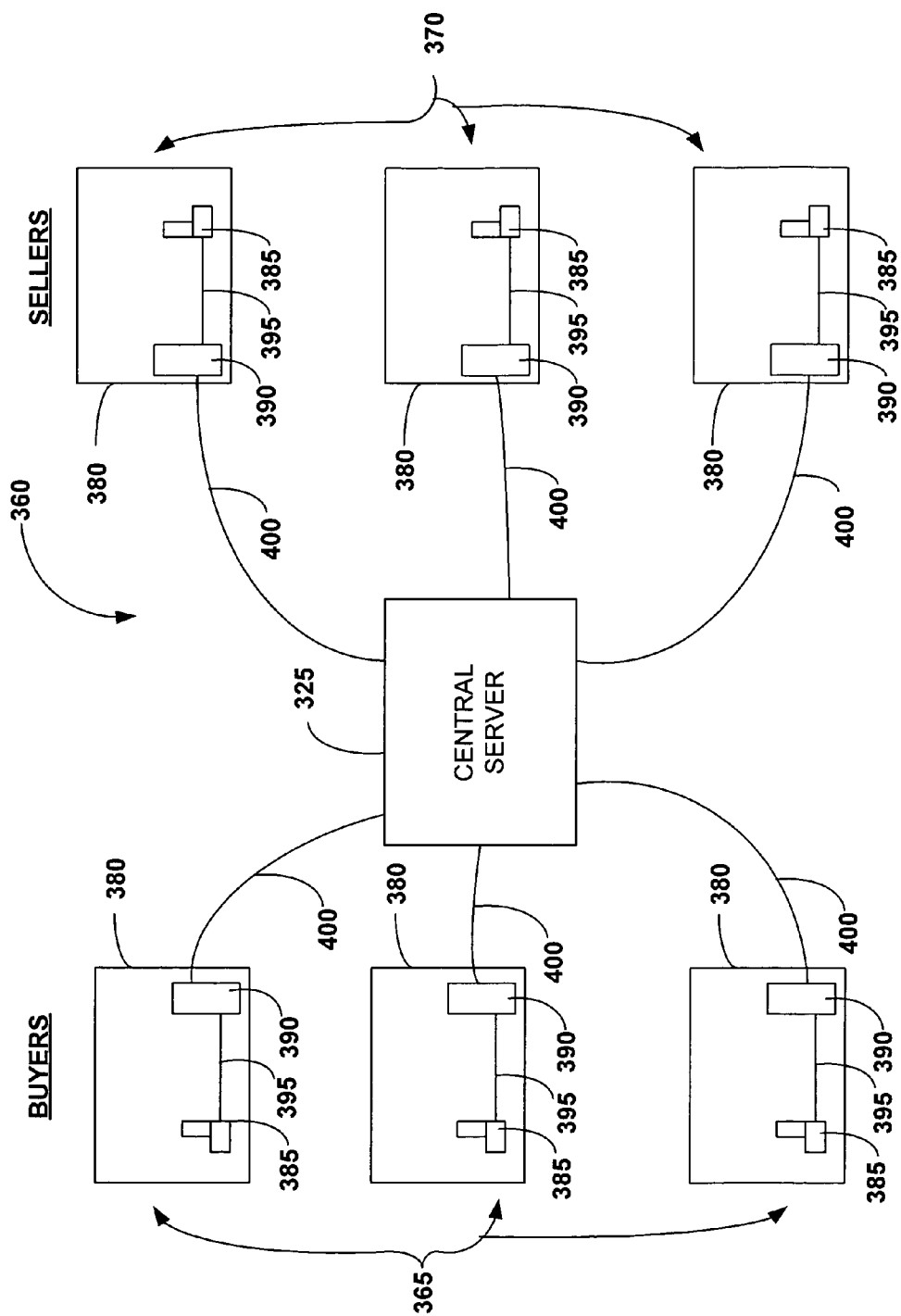
FIG. 2b illustrates a diagrammatic view of a system for modeling a business workflow process in accordance with an alternate environment of the present invention.

FIG. 2b illustrates an alternative environment for employing the present invention. A system 360 is shown in which multiple buyers 365 and sellers 370 are electronically linked via a central server 375. As discussed in more detail below, the central server 375 is configured to provide the buyers 365 and sellers 370 with a convenient forum in which to conduct business transactions in accordance with a business workflow methodology described herein. The forum may, for example, be a preestablished Internet web page where buyers 365 are able to submit purchase requests and sellers 370 are able to file responses to these purchase requests. For example, a buyer may be able to file a purchase request in accordance with a purchase request electronic form and the vendor return a purchase request confirmation electronic form. The electronic forms can reside in a database on a central server 375 or can be created based on messages transmitted by buyers 365 and sellers 370.

Each of the buyers 365 and sellers 370 may access the central server 375 in any of a variety of ways. For example, each buyer 365 and seller 370 is shown to be part of separate establishments 380 which include one or more respective computer systems 385 and local servers 390. The computer systems 385 may be, for example, a desktop or laptop computer with a local area network (LAN) interface for communicating over a network backbone 395 to the local server 390. The local servers 390, in turn, interface with the central server 375 via a network cable 400 or the like. It is to be appreciated that while the computer system 385 is depicted communicating with the central server 375 via hardwired network connections, the computer system 385 may interface with the central server 375 using a modem, wireless local area and/or wide area networks, etc. Further, it will be appreciated, that while the buyers 365 and sellers 370 are shown to part of separate establishments, the buyers 365 and sellers 370 can be part of a single establishment and represent different divisions or groups within a single business. Although, an example of an environment has been described with respect to a central server and several clients, it is to be appreciated that the present invention can be employed utilizing a peer to peer communication and composition.

The model of the present invention can be reduced to a programming language. The model of the present invention will now be illustrated with respect to an example of a business workflow process and a scheduling programming language written in XML (hereinafter referred to as SLANG) including syntax that allows for expression of features associated with the model of the present invention. The programming language allows for users to choose between conventional features of business workflow processes and model specific features in formulating custom models for the user's particular business workflow process. The language is inherently concurrent and allows a user to specify dependency and independence between components, transaction, compensation and checkpoint boundaries, as well as mechanisms for abstracting the workflow from the implementations of the components. Although, the present example refers to a scheduling language, it is to be appreciated that the present invention can apply to a variety of application programming language and is not specifically limited to a scheduling language.

The scheduling language provides a mechanism for describing and executing concurrent instances of components. The scheduling language may employ a graphical user interface that can describe dataflow by utilizing a dataflow diagram where actions are connected via data flow between them. The actions can be mapped to invocations on, for example, common object model (COM) objects, messages in queues, or other native technology behavior. The schedule easily maps onto a distributed environment due to its inherent concurrency, and can further be used to compose other schedules. A schedule can be examined at design time for deadlocks. A compiler can detect deadlock conditions between concurrent actions. A schedule can be stored on a file system, in a database, or embedded in a stream in an application. It is to be appreciated that variation of the business workflow process described herein and the programming language implementing the example would be apparent to those skilled in the art.

Figure 4A:
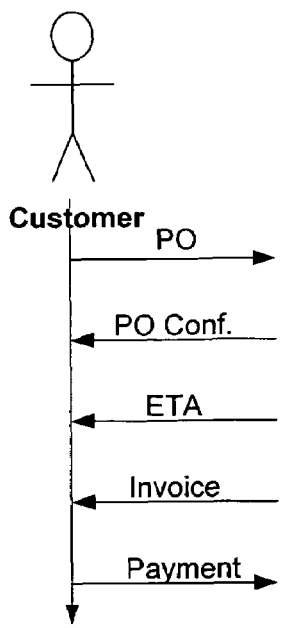
FIGS. 4a-4d illustrate the steps taken to implement the methodology of modeling a simple customer in accordance with one aspect of the present invention.
Figure 4B:
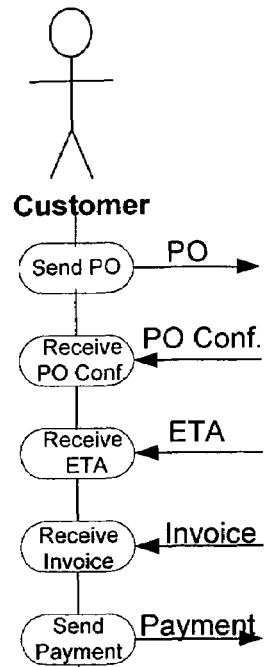
Figure 4C:
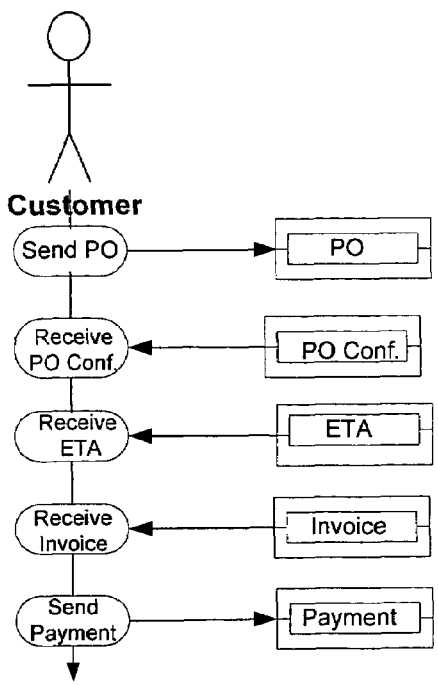
Figure 4D:
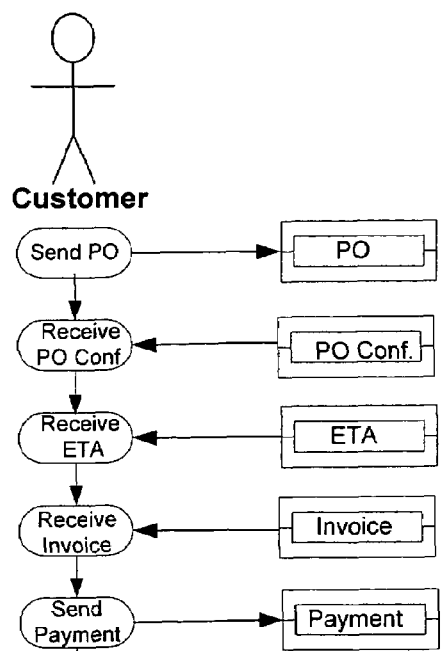
Figure 5:
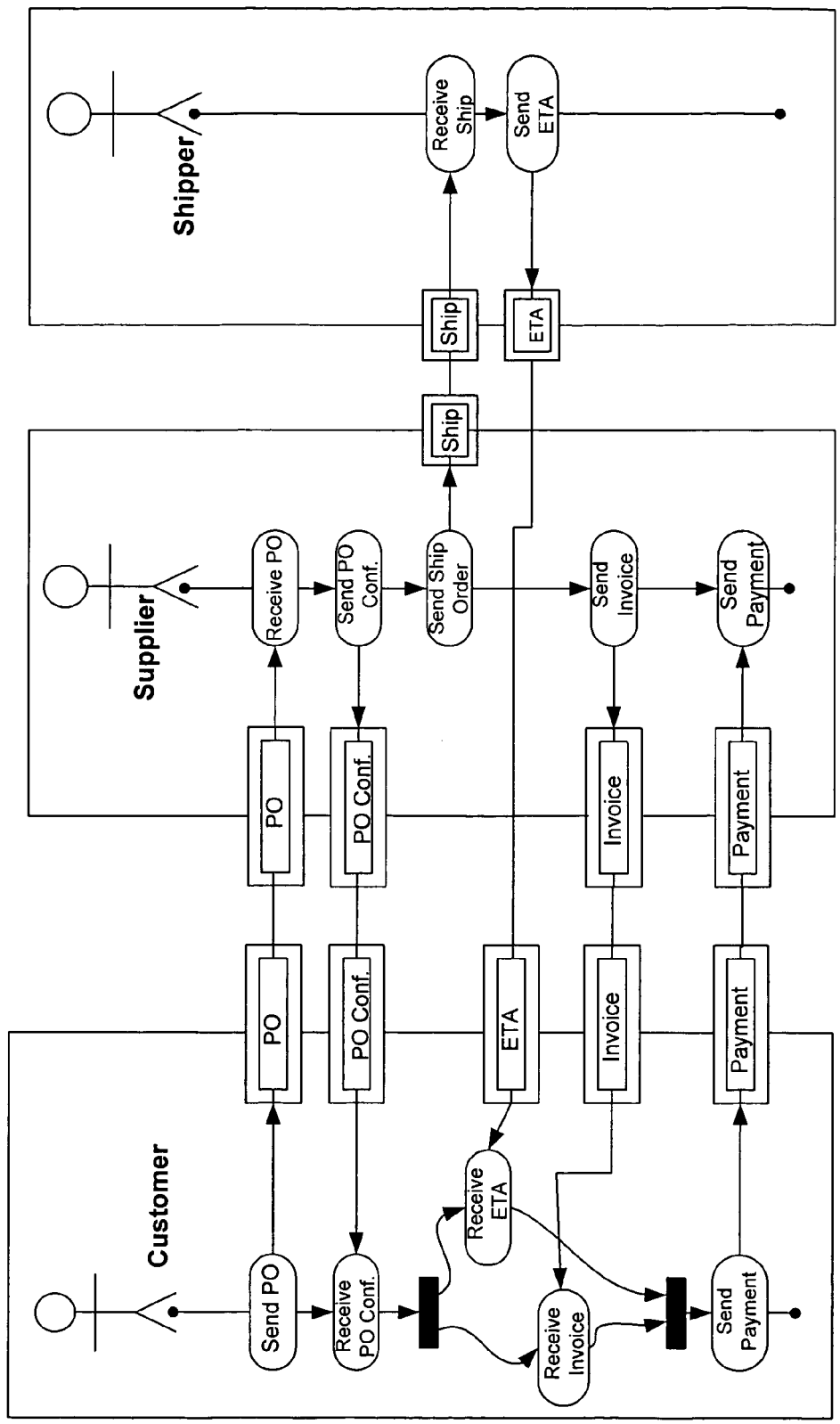
FIG. 5 illustrates a modeling interaction diagram of the simplified purchase interaction of FIG. 3 in accordance with one aspect of the present invention.

FIG. 3 illustrates a simple purchase interaction diagram in a system with autonomous interacting agents. The agents (e.g., customer, supplier and shipper) are autonomous in that their activities are concurrent and their lifetimes independent of one another. The interactions between the agents are manifested as exchanges of messages between each other (e.g., purchase orders, purchase order confirmations, ship order). The following example is centered on describing agents in terms of ordering of messages sent and received by the agents and modeling the entire system as a composition of individual agents. A completed purchase in which a product is received by the customer and the product paid for by the customer, represents a completed business workflow process. FIGS. 4a-4d illustrate treatment of the customer agent with respect to the programming language SLANG evolved from the business workflow model of the present invention. The atomic part of modeling utilizing the SLANG programming language is the description of elemental sending and receipt of messages referred to as actions (FIG. 4b). For each action, the SLANG programming language allows defining of the abstract location where a message is to be sent, known as a port, and from which port that the message is being received (FIG. 4c). Furthermore, the programming language SLANG allows a user to specify the ordering of individual actions in addition to whether those actions will be performed sequentially or concurrently (FIG. 4d). FIG. 5 illustrates the interaction between customer, supplier and shipper through messages sent and received by the ports. An example of concurrency is illustrated by the invoice receipt action and the ETA receipt action in the customer agent.

It is to be appreciated that the SLANG programming language allows the description of elaborate ordering of actions. However, the descriptions of the actions remain abstract in that each action is expressed only in terms of a port and a message. This abstraction allows for modeling of business workflow processes across various technologies by providing the binding in a separate routine that describes the concrete realization of actions onto the various technologies (e.g., a COM component, a database table).

FIG. 6 illustrates an example of the SLANG programming language syntax defined in Extended Backus-Naur Form (EBNF). The syntax includes schedule, ports, messages, contexts and process syntax. FIG. 7a illustrates schedule syntax in EBNF, while FIG. 7b illustrates schedule syntax in XML. A schedule first declares ports, messages and contexts and then describes an ordering of actions. An example of such a declaration is illustrated in FIG. 7c. FIG. 8a illustrates port syntax in EBNF, while FIG. 8b illustrates port syntax in XML. Ports are named abstract locations where messages are sent to and received from. Messages are named abstract data segments sent to and received from ports. Message syntax in EBNF is illustrated in FIG. 9a. Message syntax is illustrated in XML in FIG. 9b. Contexts are named escape points associated to some single action or process contained in a schedule. An attribute on a process or action referring to the context name effects the association to that context. A context is a label indicating where control is to be transferred when context is invoked (e.g., return). Optionally, a context can be a transaction indicating atomicity of the associated process or action. Additionally, an optional process form can accompany a transactional context to describe compensating behavior required to undo effects of the process action associated with the context. FIG. 10a illustrates context syntax in EBNF, while FIG. 10b illustrates context syntax in XML. Context allows the user to implement compensation tasks associated with transaction failures.

The schedule body describes the process or flow of messages to ports. The basic element of a process is an action. The schedule body combines the action into more elaborate processes. An action can either be a sink, indicating that the schedule is to wait for messages to arrive at a port, or a source specifying a particular message to be sent to a port. An action completes once the message is delivered to the port. Action syntax in EBNF is illustrated in FIG. 11a. Action syntax is illustrated in XML in FIG. 11b. The optional contextref syntax refers to a named escape point that can be utilized at the action level for compensation upon failure of the action. A graphical user interface component for both sink and source actions is illustrated in FIG. 11c. The graphical user interface components can be implemented for providing users a simplified method of formulating models of business workflow processes. The graphical user interface components can then be converted to programmable SLANG syntax.

FIG. 12 illustrates in EBNF notation process construct syntax. Process constructs combine actions and processes into elaborate processes. FIG. 13a illustrates EBNF notation for a zero construct, while FIG. 13b illustrates the zero construct in XML. Zero indicates a process that does nothing. A graphical user interface component of a zero construct is illustrated in FIG. 13c.

Figures 14C, 14D, 15A, 15B:
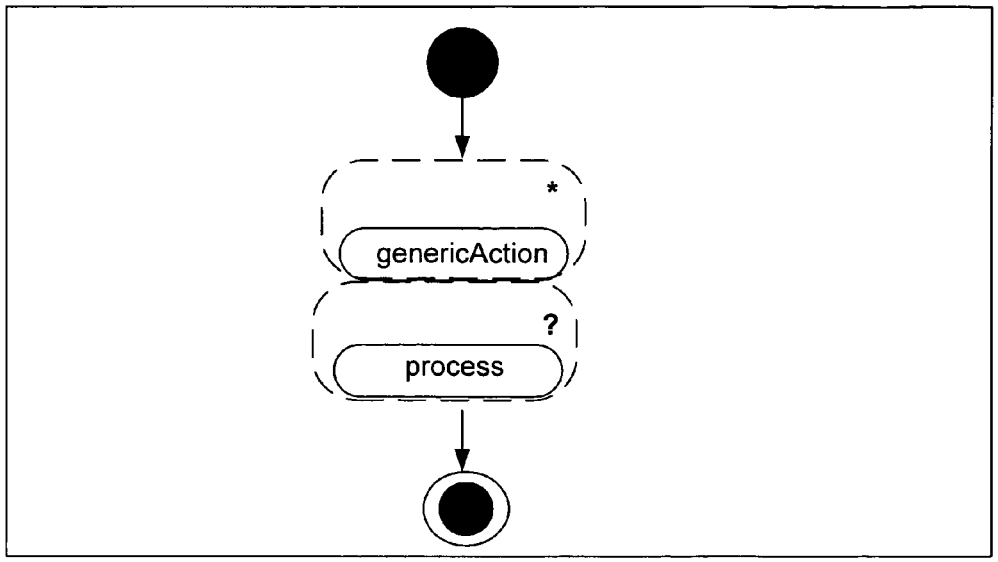
FIG. 14c illustrates a graphical image representing a sequence construct in accordance with one aspect of the present invention.
FIG. 14d illustrates implementation of a sequence construct in a schedule in accordance with one aspect of the present invention.
FIG. 15a illustrates a silence construct in EBNF notation in accordance with one aspect of the present invention.
FIG. 15b illustrates a silence construct in XML notation in accordance with one aspect of the present invention.

A sequence consists of a collection of generic actions that are executed serially. In addition to the basic actions source and sink, generic actions include silence, task, call, return and release. An optional process form concludes the sequence. A sequence completes when its last element (generic action or optional process) completes. FIG. 14a illustrates EBNF notation for a sequence constructor, while FIG. 14b illustrates the sequence constructor in XML. A graphical user interface component for a sequence constructor is illustrated in FIG. 14c. An example of a simple sequence is illustrated in FIG. 14d. The sequence operates sequentially with the sink action being performed and then the source action. Silence denotes a generic action that does nothing. FIG. 15a illustrates EBNF notation for a silence generic action, while FIG. 15b illustrates the silence generic action in XML.

Figures 16A, 16B, 16C, 16D:
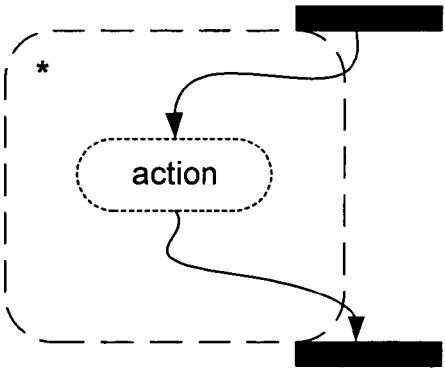
FIG. 16a illustrates a task construct in EBNF notation in accordance with one aspect of the present invention.
FIG. 16b illustrates a task construct in XML notation in accordance with one aspect of the present invention.
FIG. 16c illustrates a graphical image representing a task construct in accordance with one aspect of the present invention.
FIG. 16d illustrates implementation of a task construct in a schedule in accordance with one aspect of the present invention.

A task consists of a collection of independent concurrent actions (e.g. source or sink) that are executed in parallel. FIG. 16a illustrates EBNF notation for a task constructor, while FIG. 16b illustrates the task constructor in XML. A graphical user interface component is illustrated in FIG. 16c. An example of a simple task is illustrated in FIG. 16d. The task operates concurrently with both the source actions being performed in parallel. The task completes when all of the actions within the task complete. The task constructor allows the user to group actions and sequences, such that they execute concurrently.

A call represents the invocation of another schedule. FIG. 17a illustrates EBNF notation for a call constructor, while FIG. 17b illustrates the call constructor in XML. A call completes when the called schedule completes. A call mentions optional lists of ports and message names that are passed in as actual parameters to the called schedule. In the called schedule those ports and message references are positionally matched against that schedule ports and messages. The generic action return denotes an escape that effects a transfer of control to the named context. FIG. 18a illustrates EBNF notation for a return constructor, while FIG. 18b illustrates the return constructor in XML. Release indicates that the named context will not be invoked in the subsequent actions of the current process. FIG. 19a illustrates EBNF notation for a release constructor, while FIG. 19b illustrates the release constructor in XML. The call, return and release constructors allow users to implement compensations based on failed actions and transactions.

A switch constructor is provided specifying a list of possible branches in the control flow. Each branch consists of a case or an optional default. The cases are guarded by a test on a pair of messages. The control flow executes the process in the first case whose guard evaluates to true. The semantics of the test guarding a case is not specified in the programming language but the meaning of the test is elaborated in the schedule's binding. FIG. 20a illustrates EBNF notation for a switch constructor, while FIG. 20b illustrates the switch constructor in XML. A graphical user interface component representing the switch constructor is illustrated in FIG. 20c. An example of implementing the switch constructor in providing a loop function is illustrated in FIG. 20d. The loop is encapsulated in a schedule that is called from the main schedule with a switch testing for the loop invariant and a tail recursive call ending the loop body. When the "loopExample" schedule is called, the schedule will repeatedly wait for message m on port p until the match rule named by test evaluates to false when applied against the message pair m and mTrue.

A map construct is provided that runs a process within the scope of ports-to-messages mapping. FIG. 21a illustrates EBNF notation for a map construct, while FIG. 21b illustrates the map construct in XML. An example of implementing the map construct is provided in FIG. 21c. Each assignment in a map denotes that a message contains a reference to a port. In the process scoped by map, that port is the mapped to that message. A copy construct is provided that creates new instances of a process as needed. For example, a process is created if such creation would cause some action to occur, for example, when a message is delivered to the port corresponding to the first sink action of a copied schedule an instance of that schedule is created. FIG. 22a illustrates EBNF notation for a map construct, while FIG. 22b illustrates the map construct in XML.

A partition construct describes a collection of independent concurrent processes. The partition construct allows the users to represent transactions as autonomous independent transactions separate from concurrent interdependent transactions. In the present example, independent refers to the fact that each process in the partition refers to different ports, while concurrent meaning that all the processes in the partition proceed in parallel. FIG. 23a illustrates EBNF notation for a partition construct, while FIG. 23b illustrates the partition construct in XML. A graphical user interface component representing a partition is illustrated in FIG. 23c. A connect construct allows for modeling a simple form of communication between processes. FIG. 24a illustrates EBNF notation for a connect construct, while FIG. 24b illustrates the connect construct in XML. A graphical user interface component representing a connect construct is illustrated in FIG. 43c. The connect construct allows the users to connect processes. For example, if a source action having a port p and a message m occurs in a connected process that is connected to a sink action having a port q and a message n, the message m from the source action will be received by the sink action as a message n.

Figures 26B, 27A:
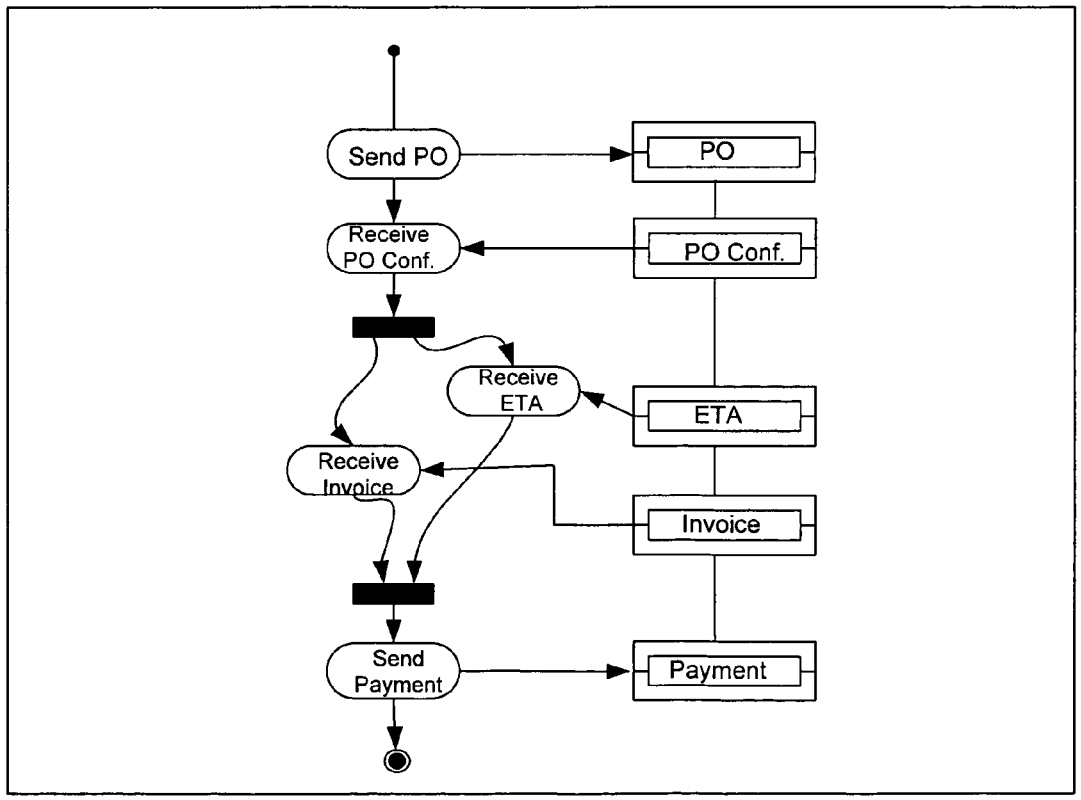
FIG. 26b illustrates an example of connecting ports using a connect expression in a schedule in accordance with one aspect of the present invention.
FIG. 27a illustrates a graphical representation of a customer business workflow process in accordance with one aspect of the present invention.

An alternate construct for providing communications among processes called a cut expression is provided. FIG. 25a illustrates EBNF notation for a cut construct, while FIG. 25b illustrates the cut construct in XML. The cut construct takes three processes as arguments and, itself, denotes a process. Three processes are, in order, a receiver, a sender, and a mediator. In most cases, the connect expression is adequate, which takes a receiver, a sender and a list of port pairs to connect. The connect construct implicitly creates a mediator from the port pair connection list. However, the more general cut expression is available for cases in with the mediator might be considered non-trivial. The purpose of the mediator is to connect ports between the sender and receiver. Without the availability of the cut construct, the sender and receiver must agree ahead of time not only on the names of the ports over which they communicate, but also make sure that those port names are in an isolated namespace, to ensure that they do not collide with ports in other processes. Cut relieves this burden on the communicating pair by placing it on a mediator. The mediator is little more than a list of ports that sender and receiver may share via shared binding constructions. For example, suppose a sender process was a source action with a port x and a message location w, and a receiver process was a sink action with a port x and a message location y, then a mediator process would be a sink action having a port u with a message location y. FIG. 26*a* illustrates the job of communicating message w to the receiver, via the private port u, so long as port z is bound in message y in all three processes. FIG. 26*b* illustrates an equivalent connect expression corresponding to the cut expression of FIG. 26*a*.

The above described syntax, formulated from the model of the present invention, allows for users to choose between conventional features of business workflow processes and model specific features in formulating custom models for the user's particular business workflow process. In particular, syntax is provided that allows users to explicitly separate autonomous independent business transactions from the interdependent concurrent business transactions, define transaction boundaries and thus improve granularity in the custom model. The syntax also allows a user to define compensating behavior as a result of failed transactions and synchronize concurrent interdependent actions and transactions based on completion of all the concurrent interdependent actions and transactions, respectively.

The syntax will now be described with reference to a simple customer-supplier example. FIGS. 27*a-b* illustrate a simple customer business workflow process. FIG. 27*a* illustrates the user graphical interface representing the business workflow process that may be formulated by the user, while FIG. 27*b* illustrates the corresponding schedule of the graphical interface containing SLANG syntax. The schedule name "customer" is declared in line 01. The header consists of lines 03-18 and includes portlist definitions (lines 04-10) and message list definitions (lines 11-17). The main body of the schedule is contained within lines 20-33 and begins with a sequence start tag and ends with a sequence end tag. As illustrated in the body, actions are performed sequentially within the sequence tags, except for actions within a task start tag and a task end tag, which are performed concurrently. The actions within the task tags represent the concurrent actions of the customer receiving an ETA message and an invoice message. The schedule will move to the next action (e.g., send payment) after the last message, of the concurrent actions, is received.

Figure 28A:
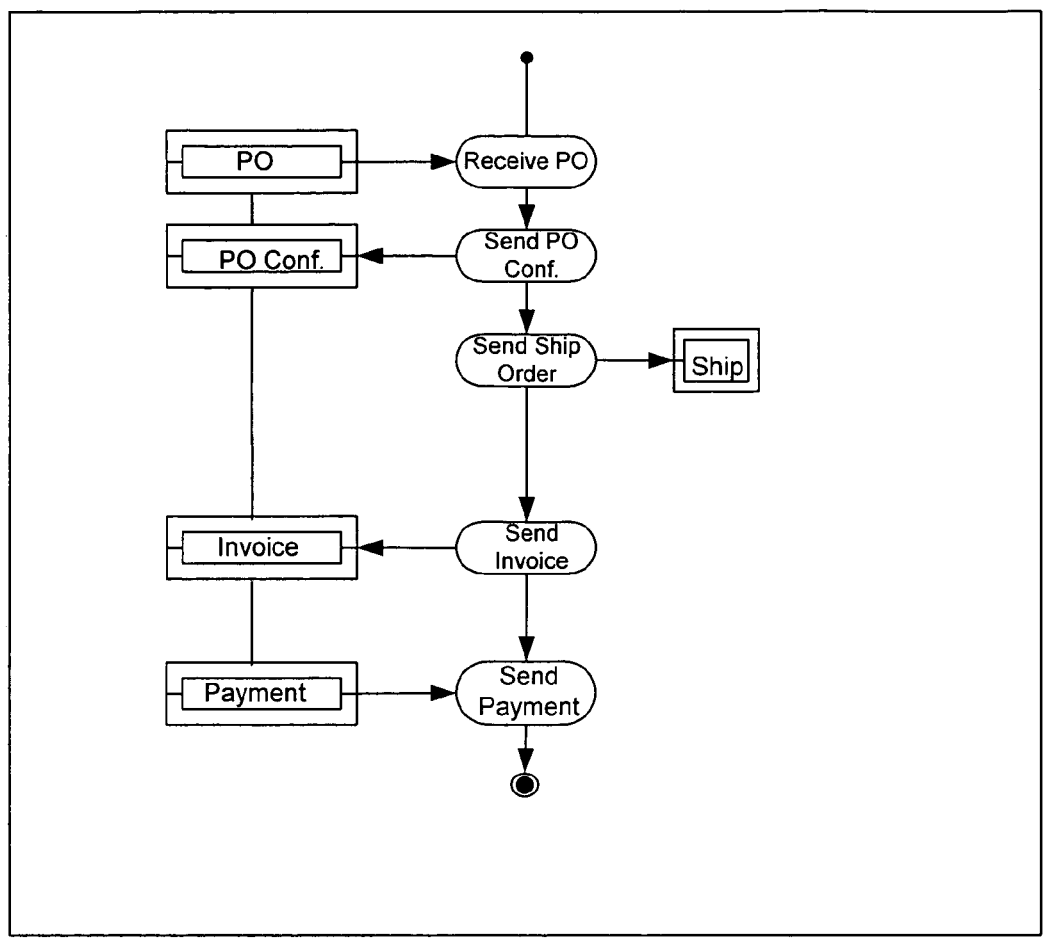
FIG. 28a illustrates a graphical representation of a supplier business workflow process in accordance with one aspect of the present invention.

FIGS. 28*a-b* illustrate a simple supplier business workflow process. FIG. 28*a* illustrates the user graphical interface representing the business workflow process that may be formulated by the user, while FIG. 28*b* illustrates the corresponding schedule of the graphical interface containing SLANG syntax. The schedule name "supplier" is declared in line 01. The header consists of lines 03-18 and includes portlist definitions (lines 04-10) and message list definitions (lines 11-17). The main body of the schedule is contained within lines 20-31 and begins with a sequence start tag and ends with a sequence end tag. As illustrated in the body, actions are performed sequentially within the sequence tags, which does not include any concurrent actions. FIGS. 29*a-b* illustrate a simple shipper business workflow process. FIG. 29*a* illustrates the user graphical interface representing the business workflow process associated with the shipper that may be formulated by the user, while FIG. 29*b* illustrates the corresponding schedule of the graphical interface containing SLANG syntax. The schedule name "shipper" is declared in line 01. The header consists of lines 03-12 and includes portlist definitions (lines 04-7) and message list definitions (lines 8-11). The main body of the schedule is contained within lines 14-19 and begins with a sequence start tag and ends with a sequence end tag. As illustrated in the body, actions are performed sequentially within the sequence tags.

Figure 30A:
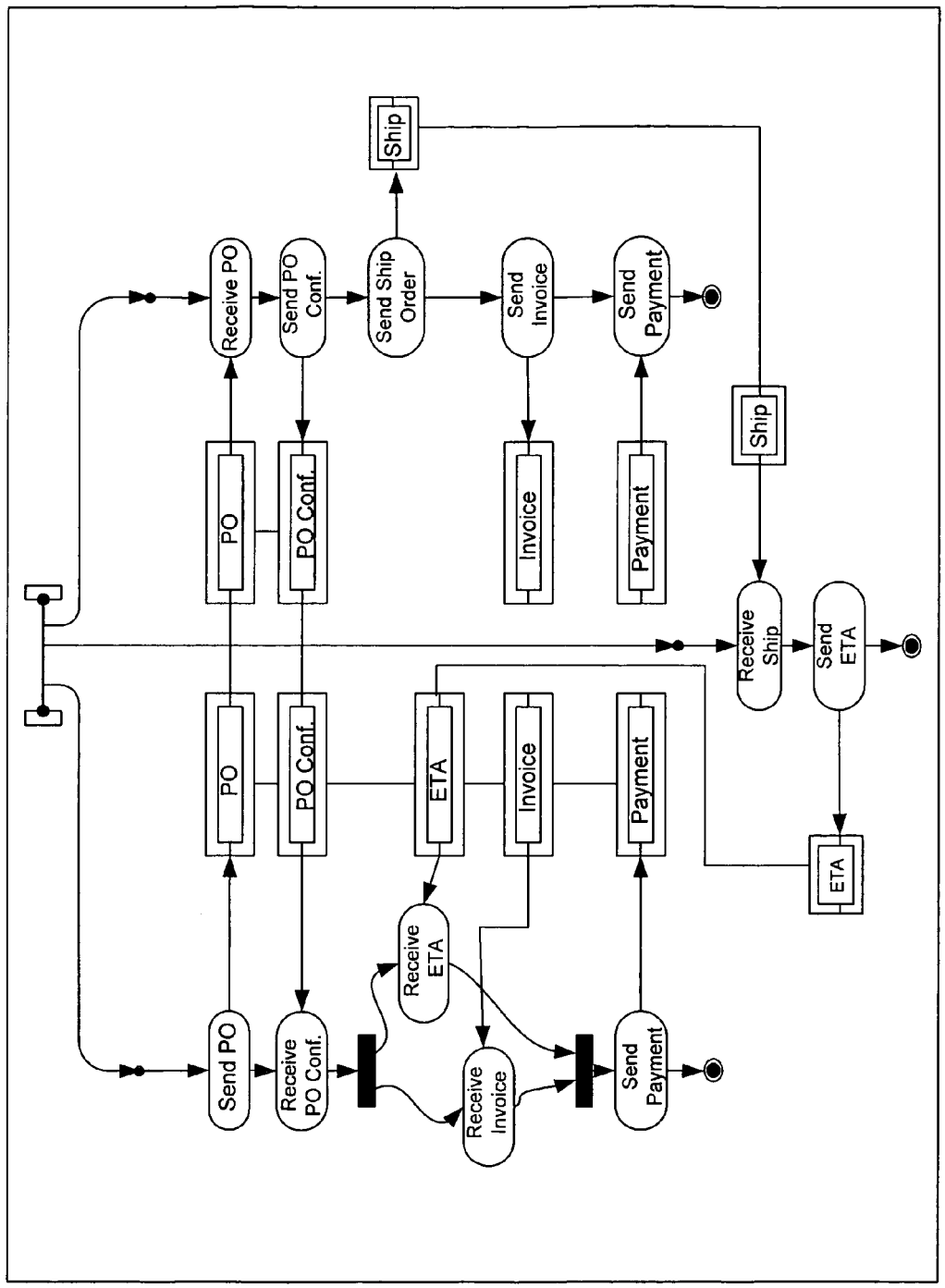
FIG. 30a illustrates a graphical representation of a combined business workflow process in accordance with one aspect of the present invention.

FIGS. 30*a-c* illustrate a combined customer supplier business workflow process. FIG. 30*a* illustrates the user graphical interface representing the business workflow process that may be formulated by the user, while FIGS. 30*b-c* illustrate the corresponding schedule of the graphical interface containing SLANG syntax. The schedule name "customerSupplier" is declared in line 01. The header consists of lines 03-18 and includes portname declarations. The main body of the schedule is contained within lines 20-60. A connection routine is provided in lines 29-47 for connecting the supplier schedule to the shipper schedule. A second connection routine is provided in lines 20-60 for connecting the customer schedule to the supplier and shipper connected schedule. This allows for the operations within the separate schedules to run concurrently, while providing communicating coupling between business operations of different entities.

Figure 31:
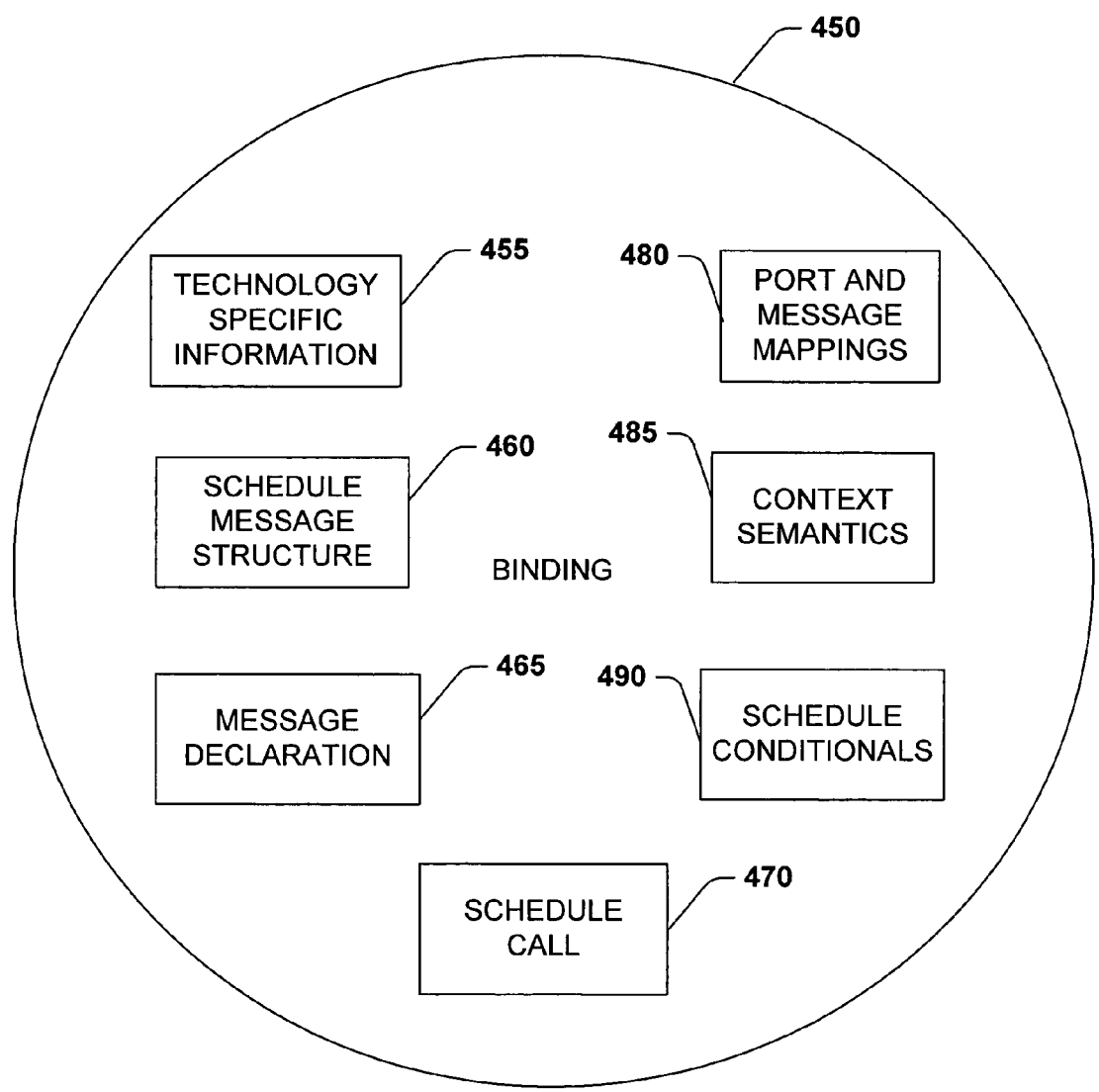
FIG. 31 illustrates components associated with a binding component in accordance with one aspect of the present invention.

FIG. 31 illustrates an example of a binding component 450 for binding the schedule to a specific business implementation and binding actions of the business process to specific technological components. The binding component 450 includes a technology specific information component 455, a schedule message structure component 460, a message declaration component 465, a port and message mapping component 480, a context semantics component 485 and a schedule conditionals component 490. The technology specific information component 455 provides information on the API or object for which the business process model is being bound. The schedule message structure component 460 describes the structure of schedule messages by associating an XML Schema ElementType with a message. The message declaration component 465 describes the association between a schedule message and the type describing its structure. The ports and message mappings component 480 maps the delivery of messages to ports within a schedule and also to objects outside the schedule. The context semantics component 485 provides association within the binding of the schedule semantics, while the schedule conditionals component 490 provides the conditional definitions for the schedule. A schedule call component 470 is provided within binding component. The binding component defines the schedule, while the schedule defines the flow of the business process.

FIG. 32 illustrates an example of a binding programming language syntax (hereinafter referred to as "BANG") defined in EBNF form. The syntax includes binding constructs that provides technology specific information, message structure information, message type information, port and message mapping to technology specific objects, context semantics or error handling information and schedule conditional information. FIG. 33*a* illustrates binding syntax in EBNF, while FIG. 33*b* illustrates binding syntax in XML. A binding statement is the top-level form of the binding file. The binding identifies the schedule that is being bound and names and collates: technology specific information that applies to the entire schedule (translationHeaderList), XML Schemas that define the structure of schedule messages (schemaList), associations between messages and their types (messageDec1List), mappings between ports and messages and the corresponding units of codes and invocations (portBindingList), semantics of contexts, and details of schedule conditionals (ruleBindingList).

As previously stated, the binding role is to relate the abstract schedule to the technology specific components. However, some technologies do not map naturally to schedule component translations (e.g., portTranslation). Therefore, the technology specific headers provide a place for this information FIG. 8a illustrates translational header syntax in EBNF, while FIG. 5b illustrates translational header syntax in XML.

The structure of schedule messages defines the business implementation and is described by associating an XML Schema ElementType with a message. The schema list provides a place to "in-line" schema definitions. Schema syntax in EBNF is illustrated in FIG. 35a. Schema syntax is illustrated in XML in FIG. 35b. The messageDec1List collates the mapping of messages to their element types (e.g., XML elements). FIG. 36a illustrates messageDec1 syntax in EBNF, while FIG. 36b illustrates messageDec1 syntax in XML. A messageDec1 describes the association between a schedule message and the type describing its structure.

The binding of ports and messages maps ports and messages to corresponding units of codes and invocations. A portBinding maps the port identified by portRef in the schedule to a technology specific translation (portTranslations e.g., containing the description of a COM interface). The portbinding then describes the mapping (messageBindingList) from the messages delivered to that port to invocation against that port translation (e.g., method invocation on a COM interface). FIG. 37a illustrates portBinding syntax in EBNF, while FIG. 37b illustrates portBinding syntax in XML. The messageBinding maps the delivery of the message identified by messageRef in the schedule to the port scoped by the portBinding to an invocation against that port translation (messageTranslation e.g., method invocation on a COM interface). The messageBinding then describes the mapping (fieldBindingList) of those message components to the relevant technology specific translations (e.g., parameters of a COM method call). FIG. 38a illustrates messageBinding syntax in EBNF, while FIG. 38b illustrates messageBinding syntax in XML.

A fieldBinding describes the mapping of a message component to the relevant technology specific translations (fieldTranslation e.g., parameters of a COM method call). The implied message is the message subject to the enclosing messagBinding. FIG. 39a illustrates fieldBinding syntax in EBNF, while FIG. 39b illustrates fieldBinding syntax in XML. The "from" statement indicates that the field data is provided from another message field. The provide/require tags indicate the data flow direction between the field and the technology specific translation. The portRef statement indicates that this field carries a port. FIG. 40a illustrates "from" syntax in EBNF, while FIG. 40b illustrates "from" syntax in XML. The "from" tag is used to describe data flow between schedule messages. It indicates that the field implied by the current scope (the enclosing fieldBinding) receives data from the field designated by fieldRef. FIG. 41a illustrates "provide" syntax in EBNF, while FIG. 41b illustrates "from provide" in XML. The "provide" tag indicates the implied message field (designated by fieldRef in the enclosing fieldBinding) supplies data to the technology translation component designated by fieldTranslation in the enclosing field Binding. FIG. 42a illustrates require syntax in EBNF, while FIG. 42b illustrates "require" syntax in XML. The "require" tag indicates the implied message field designated by fieldRef in the enclosing fieldBinding receives data from the technology translation component designated by fieldTransaltion in the enclosing fieldBinding. A latency statement describes the duration an action may be expected to take. FIG. 43a illustrates latency syntax in EBNF, while FIG. 43b illustrates latency syntax in XML.

The contextBinding allows association with a transaction SLANG context. FIG. 44a illustrates contextBinding syntax in EBNF, while FIG. 44b illustrates contextBinding syntax in XML. The contextBinding provides a description of the failure semantics for the context "retry" and "backoff" and a transaction timeout. FIG. 45a illustrates retry syntax in EBNF, while FIG. 45b illustrates retry syntax in XML. A backoff statement describes the duration to be added between retries. FIG. 46a illustrates backoff syntax in EBNF, while FIG. 46b illustrates backoff syntax in XML. A timeout statement describes the timeout for the transaction associated with the context. FIG. 47a illustrates timeout syntax in EBNF, while FIG. 46b illustrates timeout syntax in XML. The description of SLANG conditionals involves specifying the messages used in the test (the pair of messageRef statements and describing the match rule to apply to those messages to determine whether the messages "match" (i.e., whether the corresponding SLANG case evaluates to true). The match rule is either all indicating that the messages are equal or project indicating that the specified pairs of field must be equal (matchlist). FIG. 48a illustrates rulebinding syntax in EBNF. FIG. 48b illustrates ruleBinding syntax in XML. A binding example of a simple binding flow is illustrated in paragraph A of the attached Appendix. The binding example illustrates the implementation of binding a schedule to a COM interface. An XML schema of the binding syntax is provided in paragraph B of the Appendix. The XML schema reflects the constructs associated with the binding syntax.

It is to be appreciated that any programming methodology, process algebra and/or computer architecture suitable for carrying out the present invention may be employed and are intended to fall within the scope of the hereto appended claims.

The invention has been described with reference to the preferred embodiments. Obviously, modifications and alterations will occur to others upon reading and understanding the foregone detailed description. It is intended that the invention be construed as including all such modifications alterations, and equivalents thereof.

APPENDIX

A. Simple Flow

```
<?xml version="1.0"?>
<module
  xmlns="x-schema: schedulerSchema.xml"
  xmlns: com="x-schema: comSchedulerSchema.xml">
<schedule
  name="simple"
  identity="333C7BC4-460F-11D0-BC04-0080C7055A83">
<header>
  <portList>
    <port name="pA"/>
    <port name="pB"/>
  </portList>
  <message List>
    <message name="mM"/>
    <message name="mN"/>
  </messageList>
</header>
<sequence>
  <sink>    <portRef location="pA"/>
            (messageRef location="mM"/> </sink>
  <source>     <portRef location="pB"/>
               <messageRef location="mM"/> </source>
</sequence>
<schedule>
<binding>
<scheduleRef location="simple"/>
<translationHeaderList>
<translationHeader>
  <com: header synchronization="activity"/>
<translationHeader>
```

APPENDIX-continued

```
</translationHeaderList>
<schemaList>
<Schema
    name="simpleMessages"
    xmlns="urn: schemas-microsoft-com: xml-data"
    xmlns: dt="urn: schemas-microsoft-com: datatypes">
    <ElementType name="mMType" content="eltOnly">
        <element type="x"/>
        <element type="y"/>
        <element type="z"/>
    </ElementType>
    <ElementType name="x" dt: type="int"/>
    <ElementType name="y" dt: type="int"/>
    <ElementType name="z" dt: type="int"/>
</Schema>
</schemaList>
<messageDeclList>
<messageDecl>
    <messageRef location="mM"/>
    <messageTypeRef location="simpleMessages#mMType"/> <!- -
    or something like it - - >
</messageDecl>
<messageDecl>
    <messageRef location="Mn"/>
    <messageTypeRef location="junk.xm1#mNType"/> <!- - or
something like it - - >
</messageDecl>
</messageDeclList>
<portBindingList>
<portBinding>
    <portRef location="pA"/>
    <portTranslation>
        <com: interface
            iid="DF37B56C-0343-11D3-8B19-0000F8757E2A"
            clsid="DF37B56D-0343-11D3-8B19-0000F8757E2A"/>
    </portTranslation>
    <messageBindingList>
        <messageBinding>
            <messageRef location"mM"/>
            <messageTranslation>
                <com: method
                    slot="3"
                    name="foo"/>
            </messageTranslation>
            <fieldBindingList>
                <fieldBinding>
                    <fieldRef location="x"/>
                    <fieldTranslation>
                        <com: parameter
                            index="0"
                            name="x"/>
                    <fieldTranslation>
                    <provide/>
                </fieldBinding>
                <fieldBinding>
                    <fieldRef location="y"/>
                    <fieldTranslation>
                        com: parameter
                            index="1"
                            name="y"/>
                    <fieldTranslation>
                    <provide/>
                </fieldBinding>
                <fieldBinding>
                    <fieldRef location="z"/>
                    <fieldTranslation>
                        <com: parameter
                            index="2"
                            name="z"/>
                    </fieldTranslation>
                    <require/>
                </fieldbinding>
            </fieldBindingList>
        </messageBinding>
    </messageBindingList>
</portBinding>
<portBinding>
    <portRef location="pB"/>
    <portTranslation>
```

APPENDIX-continued

```
        <com: interface
            iid=\"4A0673EE-0AE5-11D3-8B1F-0000F8757E2A"
            clsid="4A0673EF-0AE5-11D3-8B1F-0000F8757E2A"/>
    </portTanslation>
    <messageBindingList>
        <messageBinding>
            <messageRef loction="mN"/>
            <messageTranslation>
                <com: method
                    slot="3"
                    name="bar"/>
            </messageTranslation>
            <fieldBindingList>
                <fieldBinding>
                    <fieldRef location="x"/>
                    <fieldTranslation>
                        <com: parameter
                            index="0"
                            name="x"/>
                    </fieldTranslation>
                    <from>
                        <fieldRef location="mM.z"/> < 1 - - or something
like it - ->
                    </from>
                    <provide/>
                </fieldBinding>
            </fieldBindingList>
        </messageBinding>
    </messageBindingList>
</portBinding>
</portBindingList>
</binding>
</module>
```

B. BANG XML

```
<!- -
    binding : : = scheduleRef translationHeaderList?
schemaList? MessageDeclList
portBindindingList contextBindingList? RuleBindindingList?
            callBindingList?
- - >
<ElementType name="binding" content="eltOnly">
    <attribute type="name"/>
    <attribute type="identity"/>
    <group order="seq">
        <element type="scheduleRef"/>
        <element type="translationHeaderList" MinOccurs=
"0" maxOccurs="1"/>
        <element type="schemaList" minOccurs="0" maxOccurs="1"/>
        <element type="messageDeclList"/>
        <element type="portBindingList"/>
        <element type="contextBindingList" minOccurs=
"0" maxOccurs="1"/>
        <element type="ruleBindingList" minOccurs"0" maxOccurs="1"/>
        <element type="callBindingList" minOccurs="0" maxOccurs="1"/>
    </group>
</ElementType>
<!- -
    translationHeaderList : : = translationHeader*
    translationHeader : : = <technology specific content>
- - >
<ElementType name="translationHeaderList">
    <element type="translationHeader" minOccurs="0" maxOccurs="*"/>
</ElementType>
<ElementType name="translationHeader"/>
<!- -
    schemaList : : = Schema*
- - >
<ElementType name="schemaList"/>
<!- -
    messageDeclList : : = messageDecl*
    messageDecl : : = messageRef messageTypeRef
- - >
<ElementType name="messageDeclList">
    <element type="messageDecl" minOccurs-"0" maxOccurs="*"/>
</ElementType>
<ElementType name="messageDecl" content="eltOnly">
    <group order="seq">
```

APPENDIX-continued

```
            <element type="messageRef"/>
            <element type="messageTypeRef"/>
        </group>
    </ElementType>
    <ElementType name="messageTypeRef">
        <attribute type="location"/>
    </ElementType>
    <!--
        portBindingList : : = portBinding*
        portBinding : : = portRef portTranslation
    messageBindingList latency?
    -->
    <ElementType name="portBindingList">
        <element type="portBinding" minOccurs="0" maxOccurs="*"/>
    </ElementType>
    <ElementType name="portBinding" content="eltOnly">
        <group order="seq"<
            <element type="portRef"/>
            <element type="portTranslation"/>
            <element type="messageBindingList"/>
            <element type="latency" minOccurs="0" maxOccurs="1"/>
        </group>
    </ElementType>
    <ElementType name="portTranlslation"/>
    <!--
        messageBindingList : : = messageBinding*
        messageBinding : : = messageRef messageTranslation
    fieldBindingList latency?
    -->
    <ElementType name="messageBindingList">
        <element type="messageBinding" minOccurs="0" maxOccurs="*"/>
    <ElementType>
    <ElementType name="messageBinding" content="eltOnly">
        <group order="seq">
            <element type="messageRef"/>
            <element type="messageTranslation"/>
            <element type="fieldBindingList"/>
            <element type="latency: minOccurs="0" maxOccurs="1"/>
        </group>
    </ElementType>
    <ElementType name="messageTranslation"/>
    <!--
        fieldBindingList : : = fieldBinding*
        fieldBinding : : = fieldRef from? provide? require?
    portRef?
    -->
    <ElementType name="fieldBindingList">
        <element typefieldBinding" minOccurs="0" maxOccurs="*"/>
    </ElementType>
    <ElementType name="fieldBinding" content="eltOnly">
        <group order="seq">
            <element type="fieldRef"/>
            <element type="fieldTranslation"/>
            <element type="from" minOccurs="0" maxOccurs="1"/>
            <element type="provide" minOccurs="0" maxOccurs="1"/>
            <element type="require" minOccurs="0" maxOccurs="1"/>
            <element type="portRef" minOccurs\"0" maxOccurs="1"/>
        </group>
    </ElementType>
    <ElementType name="fieldRef">
        <attribute type="location"/>
    </ElementType>
    <ElementType name="fieldTranlsation"/>
    <ElementType name="from">
        <element type="fieldRef"/>
    </ElementType>
    <ElementType name="provide" content="empty"/>
    <ElementType name="require" content="empty"/>
    <!--
        contextBindingList : : = contextBinding*
        contextBinding : : = contxtRef (retry backoff) ? timeout?
    -->
    <ElementType name="contextBindingList">
        <element type="contextBinding" minOccurs="0" maxOccurs="*"/>
    </ElementType>
    <ElementType name="contextBinding" content+"eltOnly">
        <group order="seq">
            <element type="contextRef"/>
            <group order="seq" minOccurs="0" maxOccurs="1">
                <element type="retry"/>
                <element type="backoff"/>
            </group>
            <element type="timeout"/>
        </group>
    </ElementType>
    <ElementType name="retry" dt: type="int"/>
    <ElementType name="backoff" dt: type="int:/>
    <ElementType name="timeout" dt: type\"int"/>
    <!--
        ruleBindingList : : = ruleBinding*
        ruleBinding : : = ruleRef messageRef messageRef
                            (all | project matchList)
    -->
    <ElementType name="ruleBindingList">
        <element type="ruleBinding" minOccurs="0" maxOccurs="*"/>
    </ElementType>
    <ElementType name="ruleBinding" content="eltOnly">
        <group order="seq">
            <element type="ruleRef"/>
            <element type="messageRef"/>
            <element type="messageRef"/>
            <group order="one">
                <element type="all"/>
                <group order="seq">
                    <element type="project"/>
                    <element type="matchList"/>
                </group>
            </group>
        </group>
    </ElementType>
    <ElementType name="all" content="empty"/>
    <ElementType name="project" content="empty"/>
    <!--
        matchList : : = match*
        match : : = fieldRef fieldRef
    -->
    <ElementType name="matchList">
        <element type="match" minOccurs="0" maxOccurs="*"/>
    </ElementType>
    <ElementType name="match" content="eltOnly">
        <group order="seq">
            <element type="fieldRef"/>
            <element type="fieldRef"/>
        </group>
    </ElementType>
    <ElementType name="latency" dt: type="int"/>
    <!--
        callBindingList : : = callBinding*
        callBinding : : = TBD
    -->
    <ElementType name="callBindingList"/>
```

What is claimed is:

1. A system that facilitates modeling of business processes comprised of a plurality of business operations, comprising:
   a computer-readable medium; and
   a plurality of computer-executable files stored on the computer-readable medium comprising:
   a scheduling component that employs a dataflow diagram constructed by a user based on an XML scheduling programming language to define a flow of a business process, the dataflow diagram includes actions that are coupled via data flowing between them and defined as virtual ports and messages representing business operations received between the virtual ports and implements the business process independent of business operations represented in the dataflow diagram and technology(ies) or application(s) through which the business operations are performed; and
   a binding component independent of the scheduling component that binds business operations associated with a business process to the technology(ies) or application(s) through which the business operations are performed, the binding component uses one or more binding files constructed by a user for the technology(ies) or application(s) through which the business operations are performed via an XML scheduling programming language to define one or more message structures, port connections, port interfaces, or message interfaces for the technology(ies) or application(s) and to resolve references to virtual ports or messages in the dataflow diagram to references to the technology(ies) or application(s).

2. The system of claim 1, the binding component further defines technology specific information for binding business operations to at least one technological component.

3. The system of claim 1, the binding component binds a single business operation to a plurality of technological components.

4. The system of claim 1, the binding files provide port and message mapping between business operations and between business operations and technological components.

5. The system of claim 1, the binding component further defines message structure and declares messages.

6. The system of claim 1, the binding component further defines context semantics.

7. The system of claim 1, the binding component further defines schedule conditionals.

8. The system of claim 1, further including a second binding component that binds the business operations with a second component outside of the dataflow diagram.

9. A system for facilitating modeling of business processes comprised of a plurality of business operations, the system comprising a computer-readable medium having stored thereon a plurality of computer-executable files comprising:
a scheduling component that defines the flow of business processes in a schedule, the schedule is created by a user via an XML scheduling programming language and comprises respective actions that correspond to respective business operations and are connected by data flowing therebetween, the actions are defined as ports representing technological components and messages representing business operations received between ports, the scheduling component can implement the business processes independent of implementations of workflow; and
a binding component created based on an XML scheduling programming language independently of the schedule that separates the schedule from implementations of a workflow and maps actions in the schedule to implementations of business operations at least in part by defining one or more message structures, port connections, port interfaces, or message interfaces for technological components that implement the business operations and resolving references to ports or messages in the schedule to the technological components.

10. The system of claim 9, the binding component binds a single business operation to a plurality of technological components.

11. The system of claim 9, wherein a binding file provides virtual port and message mapping between business operations and between business operations and technological components.

12. The system of claim 9, the binding component further defines message structure and declares messages.

13. The system of claim 9, the binding component further defines context semantics.

14. The system of claim 9, the binding component further defines schedule conditionals.

15. A computer-readable medium having stored thereon computer-executable code for implementing a business process scheduler, the code comprising:
a data flow module that allows a user to define a flow of business processes in a file that is utilized with disparate implementations of a plurality of business operations by employing an XML scheduling programming language, the data flow module represents the disparate implementations of the business operations as virtual ports, represents the business operations as messages received between the virtual ports, and implements the flow of business processes independent of the disparate implementations of the plurality of business operations; and
a binding module that allows a user to define a link between the file with business processes and the disparate implementations of the plurality of business operations by creating one or more binding files using an XML scheduling programming language that resolve references to virtual ports or messages in the file with business processes to the disparate implementations of the business processes.

16. The computer-readable medium of claim 15, wherein the binding module further allows the user to specify the business implementation to apply to a business process.

17. The computer-readable medium of claim 15, wherein the binding module further allows the user to specify programmable semantics of the data flow module.

* * * * *

UNITED STATES PATENT AND TRADEMARK OFFICE
CERTIFICATE OF CORRECTION

| | | |
|---|---|---|
| PATENT NO. | : 7,467,371 B1 | Page 1 of 1 |
| APPLICATION NO. | : 09/560371 | |
| DATED | : December 16, 2008 | |
| INVENTOR(S) | : Lucius Gregory Meredith et al. | |

It is certified that error appears in the above-identified patent and that said Letters Patent is hereby corrected as shown below:

In column 19, line 3, delete "FIG. 5b" and insert -- FIG. 8b --, therefor.

Signed and Sealed this
Third Day of May, 2011

David J. Kappos
*Director of the United States Patent and Trademark Office*